United States Patent
Zheng et al.

(10) Patent No.: US 10,375,972 B2
(45) Date of Patent: Aug. 13, 2019

(54) PROCESSED CHEESE WITH CULTURED DAIRY COMPONENTS AND METHOD OF MANUFACTURING

(71) Applicant: Kraft Foods Group Brands LLC, Northfield, IL (US)

(72) Inventors: Zuoxing Zheng, Buffalo Grove, IL (US); Ammar N. Chinwalla, Gurnee, IL (US); Christine D. Marcus-Johnson, Chicago, IL (US); Divya Shree Reddy, Lake Zurich, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

(21) Appl. No.: 13/973,660

(22) Filed: Aug. 22, 2013

(65) Prior Publication Data

US 2014/0057018 A1 Feb. 27, 2014

Related U.S. Application Data

(60) Provisional application No. 61/692,129, filed on Aug. 22, 2012.

(51) Int. Cl.
 *A23C 19/032* (2006.01)
 *A23C 19/11* (2006.01)
 *A23C 19/082* (2006.01)

(52) U.S. Cl.
 CPC ........ *A23C 19/0323* (2013.01); *A23C 19/082* (2013.01); *A23C 19/11* (2013.01); *A23C 2220/206* (2013.01); *A23Y 2240/41* (2013.01)

(58) Field of Classification Search
 CPC ... A23C 19/08; A23C 19/11; A23C 2220/206; A23C 19/0323; A23C 19/082
 (Continued)

(56) References Cited

U.S. PATENT DOCUMENTS 2,744,827 A * 5/1956 Mattick et al. .................. 426/9
3,592,740 A    7/1971 Christensen
(Continued)

FOREIGN PATENT DOCUMENTS

CN    1177542 C    12/2004
CN    1620877 A    6/2005
(Continued)

OTHER PUBLICATIONS

Grattepanche, F., Audet, P., and Lacroix, C., "Milk fermentation by functional mixed culture producing nisin Z and exopolysaccharides in a fresh cheese model", International Dairy Journal, 17 (2007) 123-132.*
(Continued)

*Primary Examiner* — Jeffrey P Mornhinweg
(74) *Attorney, Agent, or Firm* — Fitch, Even, Tabin & Flannery LLP

(57) ABSTRACT

A processed cheese composition and methods of making the processed cheese composition are provided. The processed cheese composition includes natural cheese, dairy materials and a cultured dairy component. The raw cheese is provided in a range of about 10 to about 90 weight %. The dairy materials are provided in a range of about 5 to about 50 weight % and include at least one of the group consisting of milk protein concentrate, whey protein concentrate, whey, milkfat and cream. The cultured dairy component is provided in a range of about 1 to about 20 weight % and includes an antibacterial material and/or antibacterial producing bacterial culture in combination with an exopolysaccharide and/or an exopolysaccharide producing culture.

11 Claims, 16 Drawing Sheets

Specification includes a Sequence Listing.

(58) Field of Classification Search
USPC .................................................. 426/326, 36
See application file for complete search history.

(56) References Cited

U.S. PATENT DOCUMENTS

| | | | |
|---|---|---|---|
| 3,985,901 A | 10/1976 | Barberan | |
| 4,018,752 A | 4/1977 | Buhler | |
| 4,091,117 A | 5/1978 | Mutai | |
| 4,268,528 A | 5/1981 | Montigny | |
| 4,416,905 A | 11/1983 | Lundstedt | |
| 4,518,616 A | 5/1985 | Czulak | |
| 4,584,199 A | 4/1986 | Taylor | |
| 4,597,972 A | 7/1986 | Taylor | |
| 4,798,726 A | 1/1989 | Lagarde | |
| 4,897,465 A | 1/1990 | Cordle | |
| 4,938,973 A | 7/1990 | Klaver | |
| 4,948,599 A | 8/1990 | Sagara | |
| 4,957,752 A | 9/1990 | Ivanova | |
| 5,098,721 A | 3/1992 | Kosikowski | |
| 5,173,297 A | 12/1992 | Vedamuthu | |
| 5,213,827 A | 5/1993 | Nauth | |
| 5,231,165 A | 7/1993 | Vedamuthu | |
| 5,232,849 A | 8/1993 | Vedamuthu | |
| 5,348,881 A | 9/1994 | Vedamuthu | |
| 5,356,640 A | 10/1994 | Jameson | |
| 5,445,845 A | 8/1995 | Farkye | |
| 5,458,876 A | 10/1995 | Monticello | |
| 5,482,723 A | 1/1996 | Sasaki | |
| 5,503,865 A | 4/1996 | Behringer | |
| 5,527,505 A | 6/1996 | Yamauchi | |
| 5,547,691 A | 8/1996 | Kjaer | |
| 5,594,103 A | 1/1997 | DeVos | |
| 5,626,893 A | 5/1997 | Reddy | |
| 5,635,368 A | 6/1997 | Lommi | |
| 5,654,025 A | 8/1997 | Raghunath | |
| 5,716,811 A | 2/1998 | Nauth | |
| 5,872,001 A | 2/1999 | Caufield | |
| 5,895,680 A | 4/1999 | Cirigliano | |
| 5,928,946 A | 7/1999 | DeVos | |
| 6,090,417 A | 7/2000 | Mehnert | |
| 6,110,509 A | 8/2000 | Nauth | |
| 6,120,809 A | 9/2000 | Rhodes | |
| 6,132,787 A | 10/2000 | Bunger | |
| 6,136,351 A | 10/2000 | Nauth | |
| 6,136,356 A | 10/2000 | Bunger | |
| 6,177,118 B1* | 1/2001 | Blazey et al. ................ | 426/582 |
| 6,242,016 B1 | 6/2001 | Mehnert | |
| 6,319,526 B1 | 11/2001 | Dahlstrom | |
| 6,372,268 B1 | 4/2002 | Silver | |
| 6,376,005 B2 | 4/2002 | Bunger | |
| 6,403,134 B1 | 6/2002 | Nayyar | |
| 6,426,102 B1 | 7/2002 | Isom et al. | |
| 6,613,364 B2 | 9/2003 | Begg | |
| 6,689,402 B1 | 2/2004 | Nauth | |
| 6,720,018 B2 | 4/2004 | Kawachi | |
| 6,797,308 B2 | 9/2004 | Pasch | |
| 7,026,004 B2 | 4/2006 | Loh | |
| 7,115,291 B1 | 10/2006 | Kuma | |
| 7,323,204 B2 | 1/2008 | Zheng | |
| 7,556,833 B2 | 7/2009 | Dias | |
| 7,560,127 B2 | 7/2009 | Dambmann | |
| 7,842,325 B2 | 11/2010 | Fitzsimons | |
| 7,927,638 B2 | 4/2011 | Kuma | |
| 7,968,499 B2 | 6/2011 | Gandhi | |
| 8,241,690 B2 | 8/2012 | Koertner | |
| 8,337,923 B2 | 12/2012 | Coyne | |
| 8,703,217 B2 | 4/2014 | Galer | |
| 2002/0012719 A1 | 1/2002 | Nadland | |
| 2002/0025361 A1 | 2/2002 | Kawachi | |
| 2004/0228949 A1 | 11/2004 | Pasch | |
| 2004/0258798 A1 | 12/2004 | Rhodes | |
| 2005/0042341 A1 | 2/2005 | Thomas | |
| 2005/0112238 A1* | 5/2005 | Dias et al. ................... | 426/36 |
| 2005/0129826 A1 | 6/2005 | Warmerdam | |
| 2005/0136168 A1* | 6/2005 | Cha et al. .................... | 426/582 |
| 2005/0158423 A1 | 7/2005 | Geis | |
| 2005/0226974 A1 | 10/2005 | Faragher | |
| 2005/0287272 A1 | 12/2005 | Zheng | |
| 2006/0057131 A1* | 3/2006 | Simard et al. ............ | 424/93.45 |
| 2006/0062873 A1 | 3/2006 | Yee | |
| 2006/0134297 A1 | 6/2006 | Bell | |
| 2006/0182846 A1 | 8/2006 | Trecker | |
| 2006/0257539 A1 | 11/2006 | Zheng | |
| 2007/0059398 A1 | 3/2007 | Archer | |
| 2007/0264394 A1 | 11/2007 | Dutreux | |
| 2008/0050467 A1* | 2/2008 | Schlothauer et al. ............ | 426/2 |
| 2008/0139487 A1 | 6/2008 | Haan | |
| 2008/0152757 A1 | 6/2008 | Zheng | |
| 2008/0160134 A1 | 7/2008 | Hestekin | |
| 2008/0219960 A1 | 9/2008 | Nierop Groot | |
| 2008/0254165 A1 | 10/2008 | Patel | |
| 2009/0263887 A1 | 10/2009 | Keeler | |
| 2010/0074992 A1 | 3/2010 | Horiuchi | |
| 2011/0053832 A1 | 3/2011 | Antoniewski | |
| 2011/0117241 A1 | 5/2011 | Koertner | |
| 2011/0123674 A1 | 5/2011 | Wolfschoon | |
| 2011/0129568 A1 | 6/2011 | Fukui | |
| 2011/0159163 A1 | 6/2011 | Huisman | |
| 2011/0177218 A1 | 7/2011 | Visser | |
| 2011/0244105 A1 | 10/2011 | Galer | |
| 2012/0052181 A1 | 3/2012 | Rivera | |
| 2013/0011516 A1 | 1/2013 | Griffin | |
| 2013/0052325 A1 | 2/2013 | Horan | |
| 2014/0057018 A1 | 2/2014 | Zheng | |
| 2015/0157036 A1 | 6/2015 | Marcus-Johnson et al. | |

FOREIGN PATENT DOCUMENTS

| | | |
|---|---|---|
| CN | 102715249 A | 10/2012 |
| EP | 082581 A1 | 6/1983 |
| EP | 0144274 B1 | 6/1988 |
| EP | 0712935 B1 | 6/2002 |
| EP | 1230861 A2 | 8/2002 |
| EP | 1016709 B1 | 4/2005 |
| EP | 1535519 A1 | 6/2005 |
| EP | 1752046 A1 | 2/2007 |
| EP | 1613172 B1 | 6/2007 |
| EP | 1009243 B1 | 8/2007 |
| EP | 1386540 A1 | 3/2009 |
| EP | 2011402 B1 | 2/2011 |
| EP | 2338349 A1 | 6/2011 |
| JP | 2007527213 | 9/2007 |
| JP | 2007267736 | 10/2007 |
| WO | 1989012399 | 12/1989 |
| WO | 9531561 A | 11/1995 |
| WO | 2000027214 | 5/2000 |
| WO | 2004029082 | 4/2004 |
| WO | 2009108074 A1 | 9/2009 |
| WO | 2011146916 A2 | 11/2011 |
| WO | 2012085009 A1 | 6/2012 |
| WO | 2012085010 A1 | 6/2012 |
| WO | 2014031842 | 2/2014 |

OTHER PUBLICATIONS

De Vuyst, L. and Vandamme, E. J., "Nisin, A Lantibiotic Produced by Lactocoocus lactis subsp. lactis: Properties, Biosynthesis, Fermentation and Applications," Bacteriocins of Lactic Acid Bacteria, Ch. 5, 151-221 (Chapman & Hall, 1994).*

Amiali, High nisin Z production by Lactococcus lactis UL719 in whey permeate with aeration, World Journal of Microbiology & Biotechnology vol. 14 (6): p. 887-894, Abstract from CAB Abstracts, 1 page.

Annual report, 1971, India, National Dairy Research Institute 1972, p. 234, Abstract from CAB Abstracts, 1 page.

Annual report, 1973, India, National Dairy Research Institute 1974, p. 277, Abstract from CAB Abstracts, 1 page.

Anon, Ingredients for and from fermentation, Food Technology 47 (12), 96-98, Abstract from Foodline(R): Science, 1 page.

Bachmann et al., A high-throughput cheese manufacturing model for effective cheese starter culture screening, Journal of Dairy

(56) References Cited

OTHER PUBLICATIONS

Science [J Dairy Sci] Dec. 2009; vol. 92 (12), pp. 5868-5882, Abstract from Medline, 2 pages.
Barnby-Smith et al., Production of antimicrobial compounds by lactic acid bacteria, Research Report—British Food Manufacturing Industries Research Association, 1989 (662): p. (iv) + 53, Abstract from CAB Abstracts, 1 page.
Bayoumi, Nisin and yoghurt manufacture, Chemie Mikrobiologie Technologie der Lebensmittel 1991, 13 (3/4) 65-69, Abstract from Food Sci.&Tech.Abs, 1 page.
Benech et al., Inhibition of Listeria innocua in cheddar cheese by addition of nisin Z in liposomes or by in situ production in mixed culture, Applied and Environmental Microbiology [Appl Environ Microbiol] Aug. 2002; vol. 68 (8), pp. 3683-3690, Abstract from Medline, 3 pages.
Bonnet et al., Acid-tolerant Listeria monocytogenes persist in a model food system fermented with nisin-producing bacteria, Letters in Applied Microbiology, 2005, 40 (4), 237-242, Abstract from Foodline(R): Science, 1 page.
Choi et al., Production of a nisin-like bacteriocin by Lactococcus lactis subsp. lactis A164 isolated from kimchi, Journal of Applied Microbiology 2000, 88 (4) 563-571, Abstract from Food Sci.&Tech. Abs, 1 page.
Christiansen et al., Potential of anticlostridial Lactobacillus isolated from cheese to prevent blowing defects in semihard cheese, International Journal of Dairy Technology; Nov. 2010, vol. 63 Issue 4, p. 544-551, Abstract from Academic Search Complete, 2 pages.
Doleyres et al., Increased stress tolerance of Bifidobacterium longum and Lactococcus lactis produced continuous mixed-strain immobilized-cell fermentation, Journal of Applied Microbiology 97 (3), 527-539, Abstract from Foodline(R): Science, 1 page.
Doleyres et al., Increased stress tolerance of Bifidobacterium longum and Lactococcus lactis produced during continuous mixed-strain immobilized-cell fermentation, Journal of Applied Microbiology 2004, 97 (3) 527-539, Abstract from Food Sci.&Tech.Abs, 1 page.
Fallico et al., Novel conjugative plasmids from the natural isolate Lactococcus lactis subspecies cremoris DPC3758: A repository of genes for the potential improvement of dairy starters, Journal of Dairy Science [J Dairy Sci] Jul. 2012; vol. 95 (7), pp. 3593-3608, Abstract from Medline, 2 pages.
Garcia-Parra et al., Enhancement of nisin production in milk by conjugal transfer of the protease-lactose plasmid pLP712 to the wild strain Lactococcus lactis UQ2, International Journal of Dairy Technology; Nov. 2010, vol. 63 Issue 4, p. 523-529, Abstract from Academic Search Complete, 2 pages.
Goulhen, Production of a nisin Z/pediocin mixture by pH-controlled mixed-strain batch cultures in supplemented whey permeate, Journal of Applied Microbiology vol. 86 (3): p. 399-406, Abstract from CAB Abstracts, 1 page.
Grattepanche et al., Quantification by real-time PCR of Lactococcus lactis subsp. cremoris in milk fermented by a mixed culture, Applied Microbiology and Biotechnology [Appl Microbiol Biotechnol] Jan. 2005; vol. 66 (4), pp. 414-421. Date of Electronic Publication: Jul. 23, 2004, Abstract from Medline, 2 pages.
Ivana et al., Characterization and Antimicrobial Activity of Natural Isolate Lactococcus Lactis Subsp. Lactis BGSM1-19, Acta Veterinaria; 2007, vol. 57 Issue 5/6, p. 509-521, Abstract from Academic Search Complete, 3 pages.
Kanatani et al., Inhibition of hiochi-bacteria by nisin, Journal of Fermentation and Bioengineering 1992, 74 (3) 194-195, Abstract from Food Sci.&Tech.Abs, 1 page.
Krastanov, Controlling of malolactic fermentation and Lactobacillus brevis grow with immobilized onto membrane nisin, Khranitelnovkusova Promishlenost 2007, No. 1, 41-44, Abstract from Food Sci.&Tech.Abs; 1 page.
Krastanov et al., Antimicrobial activity of nisin immobilized onto membrane, Bulgarian Journal of Agricultural Science vol. 6 (3): p. 333-337, Abstract from CAB Abstracts, 1 page.
Lacroix, Production of bacteriocin from whey permeate by fermentation with lactic acid bacteria, Whey: proceedings of the second international whey conference, held in Chicago, USA, Oct. 27-29, 1997, Bibliographic Information from CAB Abstracts, 1 page.
Lee et al., The binding and degradation of nisin by mixed ruminal bacteria, FEMS Microbiology Ecology vol. 42 (3): p. 339-345. Abstract from CAB Abstracts, 1 page.
Lipinska et al., Studies on the production and utilization of nisin-containing milk powder in feeding of calves, Roczniki Instytutu Przemyslu Mleczarskiego vol. 20 (3): p. 27-40, Abstract from CAB Abstracts, 1 page.
Meijer, Expression and release of proteolytic enzymes of Lactococcus lactis : ripening of UF-cheese, Wageningen Agricultural University, Wageningen Netherlands, 1997, Abstract from CAB Abstracts, 1 page.
Mills et al., Inhibitory activity of Lactobacillus plantarum LMG P-26358 against Listeria innocua when used as an adjunct starter in the manufacture of cheese, Microbial Cell Factories; 2011 Supplement 1, vol. 10 Issue Suppl 1, p. 1-11, Abstract from Academic Search Complete, 2 pages.
Mills et al., The changing face of dairy starter culture research: From genomics to economics, International Journal of Dairy Technology; May 2010, vol. 63 Issue 2, p. 149-170, Abstract from Academic Search Complete, 2 pages.
Nykanen et al., Synergistic antimicrobial effect of nisin whey permeate and lactic acid on microbes isolated from fish, Letters in Applied Microbiology vol. 27 (6): p. 345-348, Abstract from CAB Abstracts, 1 page.
Reunanen et al., Microplate bioassay for nisin in foods, based on nisin-induced green fluorescent protein fluorescence, Applied and Environmental Microbiology 2003, 69 (7)4214-4218, Abstract from Food Sci.&Tech.Abs, 1 page.
Schillinger et al., Efficacy of nisin in combination with protective cultures against Listeria monocytogenes Scott A in tofu, International Journal of Food Microbiology 2001 vol. 71 (2/3). p. 159-168, Abstract from CAB Abstracts, 1page.
Schillinger et al., Use of nisin in combination with protective cultures for inhibition of Listeria monocytogenes in two mild delicatessen salads, Archiv fuer Lebensrnittelhygiene 2001, 52 (6) 113-144, Abstract from Food Sci.&Tech.Abs, 1 page.
Su et al., Studies on the natural antimicrobial agents of lactic bacteria. II. Cultured conditions on antimicrobial agents-producing lactic bacteria and separation of antimicrobial agents, Journal of the Chinese Agricultural Chemical Society 1988, 26 (2) 197-203, Abstract from Food Sci.&Tech.Abs, 1 page.
Trm●i‡et al., Expression of nisin genes in cheese—a quantitative real-time polymerase chain reaction approach, Journal of Dairy Science [J Dairy Sci] Jan. 2011; vol. 94 (1), pp. 77-85, Abstract from Medline, 2 pages.
Veljovic et al., Preliminary characterization of lactic acid bacteria isolated from Zlatar cheese, Journal of Applied Microbiology; Dec. 2007, vol. 103 Issue 6, p. 2142-2152, Abstract from Academic Search Complete, 2 pages.
Welch, Spoilage of Feta cheese produced by ultrafiltration techniques and the potential use of nisin in its prevention, North European Dairy Journal 1985, 51 (6) 162-166, Abstract from Food Sci.&Tech.Abs, 1 page.
Schillinger et al., Application of nisin in combination with protective cultures to inhibit Listeria monocytogenes in two mild delicatessen salads, Archiv fur Lebensmittelhygiene (Nov.-Dec.), 2001. 52 (6), 116-119, Abstract from Foodline(R): Science, 1 page.
International Search Report and Written Opinion issued in PCT/US2013/056169, dated Dec. 17, 2013, 11 pages.
O. Janevski, A.N. Hassan, and L. Metzger, Application of salt whey in process cheese food made from Cheddar cheese containing exopolysaccharides, 8 pages.
A.N. Hassan, S. Awad, and V.V. Mistry, Reduced Fat Process Cheese Made form Young Reduced Fat Cheddar Cheese Manufactured with Exopolysaccharide-Producing Cultures, 9 pages.
A.N. Hassan, ADSA Foundation Scholar Award: Possibilities and Challenges of Exopolysaccharide-Producing Lactic Cultures in Dairy Foods, 17 pages.
International Search Report and Written Opinion, International Patent Application No. PCT/US2014/069278, completion date Mar. 5, 2015, 12 pages.

(56) References Cited

OTHER PUBLICATIONS

Qiao, M., et al., "Regulation of the nisin operons in Lactococcus lactis N8." Journal of Applied Bacteriology, 1996, vol. 80, pp. 626-634.
"Milk and Dairy Products in Human Nutrition." Food and Agriculture Organization of the United Nations, Chapter 3, 2013, 110 pages.
Kallinteri, L.D., et al., "Efficacy of Nisin and/or Natamycin to Improve the Shelf-Life of Galotyri Cheese." Food Microbiology, vol. 36, May 29, 2013, pp. 176-181.

* cited by examiner

| Gene/nt position | 329 | | | ATCC 11454 | | | NB1 | | |
|---|---|---|---|---|---|---|---|---|---|
| | Position | Reference | Change | Position | Reference | Change | Position | Reference | Change |
| acmD 180-610 | No Changes | | | No Changes | | | 409 | T | C |
| | | | | | | | 447 | G | A |
| | | | | | | | 600 | T | A |
| gapB 70-510 | No Changes | | | 433 | A | G | No Changes | | |
| pdhD 515-910 | No Changes | | | 823 | T | A | 619 | C | T |
| | | | | | | | 634 | G | A |
| | | | | | | | 823 | T | A |
| pepC 250-680 | No Changes | | | No Changes | | | 306 | C | T |
| | | | | | | | 349 | T | G |
| | | | | | | | 370 | A | G |
| | | | | | | | 613 | A | G |
| thiE 110-535 | No Changes | | | No Changes | | | 256 | C | T |
| | | | | | | | 262 | C | T |
| | | | | | | | 293 | C | G |
| | | | | | | | 390 | A | G |
| | | | | | | | 487 | T | A |
| yjjD 1165-1590 | No Changes | | | No Change | | | 1214 | T | C |
| | | | | | | | 1397 | C | T |
| | | | | | | | 1488 | C | T |
| | | | | | | | 1534 | C | T |
| | | | | | | | 1538 | C | A |
| | | | | | | | 1554 | A | G |
| | | | | | | | 1566 | C | T |
| | | | | | | | 1569 | C | A |
| | | | | | | | 1573 | G | A |
| yyaL 400-830 | No Changes | | | 544 | T | A | 578 | T | C |
| | | | | 578 | T | C | | | |
| Nisin Type | A | | | A | | | Z | | |

\* Specific changes in nucleotides are listed for each of the genes examined

Fig. 10

| Phage | | Host | | |
|---|---|---|---|---|
| Name | Number | 329 | NB-1 | ATCC 11454 |
| 2T1 | 61 | R | S | R |
| VI6 | 136 | R | R | R |
| 2-3 | 151 | R | S | R |
| PP | 211 | R | R | R |
| EL-2 | 213 | R | R | R |
| N046 | 219 | R | R | R |
| N067 | 220 | R | R | R |
| NC | 221 | R | R | R |
| SP | 222 | R | R | R |

R=Resistant
S=Sensitive

| Culture | Phage Type |
|---|---|
| 329 | 1 |
| NB-1 (ATCC PTA-8748) | 2 |
| ATCC 11454 | 1 |

1=No Phages have been identified
2=Phages have been identified Pattern #1

Fig. 11

| Kraft Culture 329 | L. lactis subsp. Lactis CV56 | L. lactis subsp. Lactis IO-1 | L. lactis subsp. Lactis KF147 | L. lactis subsp. Cremois A76 | Gene Name Annotation | |
|---|---|---|---|---|---|---|
| 1 | 0 | 1 | 1 | 1 | Transcriptional regulator XRE Family | |
| 1 | 0 | 0 | 1 | 1 | Esterase EpsX | |
| 1 | 0 | 0 | 1 | 0 | Tyrosin-protein kinase transmembrane modulator | |
| 1 | 0 | 0 | 1 | 1 | Tyrosin-Protein Kinase | |
| 1 | 0 | 0 | 0 | 0 | Undecaprenyl-phosphate galactose | |
| 1 | 0 | 0 | 1 | 1 | Manganese Dependent Tyrosine-protein phosphatase | EPS Cluster |
| 1 | 0 | 0 | 0 | 0 | Polysaccharide biosynthesis protein cpsF | |
| 1 | 0 | 0 | 0 | 0 | Glycosyltransferase cpsg | |
| 1 | 0 | 0 | 0 | 0 | Glycosyltransferase Family 2 protein | |
| 1 | 0 | 1 | 0 | 1 | Sugar Transferase EpsL | |
| 1 | 0 | 0 | 0 | 0 | Protein of unknown function | |
| 1 | 0 | 0 | 0 | 0 | Protein of unknown function ( back end of the gene similar to S.thermophilus eps type VII operon) | |
| 1 | 0 | 0 | 0 | 0 | Polysaccharide biosynthesis protein cpsm (portion similar to S.agalactiae gene in cps cluster) | |
| 1 | 1 | 1 | 1 | 0 | Nisin Precursor NisinA | |
| 1 | 1 | 1 | 0 | 0 | Nisin Biosynthesis protein NisB | |
| 1 | 1 | 1 | 1 | 0 | Nisin Transport ATP-binding protein nisT | |
| 1 | 1 | 1 | 0 | 0 | Nisin biosynthesis protein NisC | |
| 1 | 1 | 1 | 1 | 0 | Nisin Immunity protein NisI | |
| 1 | 1 | 1 | 0 | 1 | Nisin Leader peptide-processing serine protease nisP | Nisin Cluster |
| 1 | 1 | 1 | 1 | 0 | Nisin biosynthesis two-component system, response regulator NisR | |
| 1 | 1 | 1 | 1 | 0 | Nisin biosynthesis two-component system, sendor histidine kinase NisK | |
| 1 | 1 | 1 | 1 | 0 | Nisin transport protein NisF | |
| 1 | 1 | 1 | 1 | 0 | Nisin transport protein NisE | |
| 1 | 1 | 1 | 1 | 0 | Nisin transport protein NisG | |
| 0 | 0 | 0 | 0 | 0 | nisin resistance protein | |

CV56 is a nisin producer
IO-1 is a nisin producer
KF147 is not a nisin producer but is nisin resistant.
A76 is not a nisin producer

Fig. 13

SEQUENCE LISTING

```
<160> NUMBER OF SEQ ID NOS: 33

<210> SEQ ID NO 1
<211> LENGTH: 34
<212> TYPE: PRT
<213> ORGANISM: Lactococcus lactis
<220> FEATURE:
<221> NAME/KEY: MISC_FEATURE
<222> LOCATION: (2)..(2)
<223> OTHER INFORMATION: Dehydrobutyrine (beta-methyldehydroalanine)
<220> FEATURE:
<221> NAME/KEY: THIOETH
<222> LOCATION: (3)..(7)
<220> FEATURE:
<221> NAME/KEY: MISC_FEATURE
<222> LOCATION: (5)..(5)
<223> OTHER INFORMATION: Dehydroalanine
<220> FEATURE:
<221> NAME/KEY: THIOETH
<222> LOCATION: (8)..(11)
<220> FEATURE:
<221> NAME/KEY: MISC_FEATURE
<222> LOCATION: (8)..(8)
<223> OTHER INFORMATION: Amino butyric acid
<220> FEATURE:
<221> NAME/KEY: THIOETH
<222> LOCATION: (13)..(19)
<220> FEATURE:
<221> NAME/KEY: MISC_FEATURE
<222> LOCATION: (13)..(13)
<223> OTHER INFORMATION: Amino butyric acid
<220> FEATURE:
<221> NAME/KEY: THIOETH
<222> LOCATION: (23)..(26)
<220> FEATURE:
<221> NAME/KEY: MISC_FEATURE
<222> LOCATION: (23)..(23)
<223> OTHER INFORMATION: Amino butyric acid
<220> FEATURE:
<221> NAME/KEY: THIOETH
<222> LOCATION: (25)..(28)
<220> FEATURE:
<221> NAME/KEY: MISC_FEATURE
<222> LOCATION: (25)..(25)
<223> OTHER INFORMATION: Amino butyric acid
<220> FEATURE:
<221> NAME/KEY: MISC_FEATURE
```

<222> LOCATION: (33)..(33)
<223> OTHER INFORMATION: Dehydroalanine

<400> SEQUENCE: 1

Ile Xaa Ala Ile Xaa Leu Ala Xaa Pro Gly Ala Lys Xaa Gly Ala Leu
1               5                   10                  15
Met Gly Ala Asn Met Lys Xaa Ala Xaa Ala His Ala Ser Ile His Val
            20                  25                  30
Xaa Lys

<210> SEQ ID NO 2
<211> LENGTH: 1086
<212> TYPE: DNA
<213> ORGANISM: Lactococcus lactis

<400> SEQUENCE: 2

| | |
|---|---|
| atgaaacaga acataaaatt agcgcttggt gcgtcaattg ttgctttggc aagtcttggt | 60 |
| gggattaaag cacaagctgc atctgttcaa gaaattatta cgctgcggt accagtggca | 120 |
| aatgactacg gactttatcc atcagtaatg attgcccaag ggattttaga atcaagtggt | 180 |
| ggacaaagtg ccttagcaag caattataat aatattttg gagttaaata cacttctggt | 240 |
| acacctgttt atctaccaac acaagagtat ttgaatggaa caatgacaaa tgttgttgaa | 300 |
| cccttccaag cttatagctc agtttatgac gcatgtgttg cccaagctaa atgttacgt | 360 |
| gcttcatcat attattctgg ggcttggcgt gaaaatacaa gttcttactt agatgcgaca | 420 |
| gcttggcttg aaggacgtta tgccacggat ccaacttatg cttctaaatt gaatagcgtg | 480 |
| atttctgaac ttggtttaag tgtttatgac caaggaggag aaatatcagg aggaactgct | 540 |
| gttacaacta gttcatcagc ctcaacaaat tcagctggca catacaaagt acaagagggt | 600 |
| gattcattat cagcaatcgc tgctcaatat ggtacaactg ttgatgcact tgtgtcagca | 660 |
| aatagtttag aaaatgcgaa cgatattcat gtaggagaag ttttgcaagt tgctggtgct | 720 |
| agcacaacta caacaagtac caatacaact tccaatgtat cgtcaagttc tacttatacc | 780 |
| gtcaaatcag gagatagttt atattcgatt gcggaacaat atggaatgac tgtttcatca | 840 |
| ctgatgtcag ccaatggaat ttatgatgtt aattcaatgc ttcaagtagg acaagtattg | 900 |
| caagtaactg taagtactag tgcaacaact tcaaacacaa cgacttcaaa cagttataca | 960 |
| attcaaaatg gtgacagcat ttattcaatt gccacagcaa atggtatgac agctgaccaa | 1020 |
| ttagcagccc tcaatggatt tggaattaat gacatgattc atccaggaca aacaattaga | 1080 |
| atctaa | 1086 |

<210> SEQ ID NO 3
<211> LENGTH: 1011
<212> TYPE: DNA
<213> ORGANISM: Lactococcus lactis

<400> SEQUENCE: 3

| | |
|---|---|
| atggtagtta aagttggtat taacggttc ggtcgtatcg gtcgtcttgc tttccgtcgt | 60 |
| attcaaaatg ttgaaggtgt tgaagttgtt gcaatcaacg acttgacaga tccagcaatg | 120 |
| cttgctcact tgcttaaata cgatacaact caaggtcgtt ttgatggtaa agttgaagtt | 180 |
| aaagatggtg gttttgaagt taacggtaaa ttcgttaaag ttactgctga atctaaccca | 240 |
| gctaacatca actgggctga agttggtgca gaaatcgttc ttgaagcaac tggtttcttc | 300 |
| gcaactaaag aaaaagctga acaacacttg cacgctaacg gtgctaaaaa agttgttatc | 360 |

```
actgcacctg gtggatctga tgttaaaaca atcgttttca acactaacca cgaagtactt      420
gatggaactg aaacagtaat ttcagctggt tcatgtacaa ctaactgtct tgctccaatg      480
gctgatactt tgaacaaaca attcggtatc aaagttggta caatgactac agttcacggt      540
tacactggtg accaaatgac tcttgatggc ccacaccgtg gtggagactt ccgtcgcgca      600
cgtgctgcag ctgaaaacat cgtacctaac tcaacaggtg ctgctaaagc tatcggtctt      660
gtattgccag aacttcaagg taaacttcaa ggacatgctc aacgtgtacc agttccaact      720
ggttcattga ctgaacttgt tactatcctt aacaaagaag ttacagttga cgaaatcaac      780
gcagctatga agctgcttc aaatgaatca tttggttaca cgaagacca aatcgtttca       840 tctgatatcg ttggtatctc aaactcttca ctctttgatg ctactcaaac tgaagttact      900
tcagctgatg gagctcaact tgttaaaact gtatcttggt acgataacga aatgtcatac      960
acttcaaacc ttgttcgtac acttgcatac ttcgctaaaa tcgctaaata a             1011

<210> SEQ ID NO 4
<211> LENGTH: 1419
<212> TYPE: DNA
<213> ORGANISM: Lactococcus lactis

<400> SEQUENCE: 4
atggttgttg gtgcacaagc aacagaagtt gatttggttg ttattggttc aggccctggt       60
ggttatgttg cagccatccg tgcggctgaa cttggtaaaa agttacaat tattgaaaaa       120 gataatgttg gtggggtttg tttaaatatt ggttgtatcc catcaaaagc attgattaat      180
attggtcatc attaccaaga atctttggag gaagaaaaag gagaaaatcc ttttggtctt      240
tctgtcggaa atgttaaatt aaactgggaa tctgcccaaa atggaaaca agataaagtt       300 gtcaaccagt tgacaggtgg tgttaaaatg ctacttaaaa acacaaagt tgacgtgatt      360 caaggaactg cagaatttat tgataacaat acaataaatg ttgaacaaga agatgggttc      420
caacttttgc aatttaatga tgtgattatc tcaactggtt cacgtcctat cgaaattcct      480
tctttcccat tggtggtcg cattattgac tctactggtg cttgtcact tccagaagtt       540 cctaaacatt tgattattgt tggggaggga gttattggtt ctgagcttgg tggagcatac      600
cgtatgctcg gttctaagat tacaattgtt gaaggtttgg accacatttt aaacgggttt      660
gataaagaaa tgtctgatat cattgctaat cgcgttaaat ctgctggttc tgaaatcttt      720
acttcagcaa tggctaaatc agctactcaa actgataaag atgtaacttt gactttgag      780 gttgacggaa agaacaaac ggtgactggt gattacttac tcgtttctgt tggacgtcgt      840
ccaaatactg atttaatcgg cttgaacaac actgatgtta aattgactga ccgtggtttg      900
attgaagttg acgattctta tgcaactaat gttcctcaca tttatgcaat cggtgatgtg      960
gttcctggtc caatgctcgc tcacaaagct tctttccaag ctaaagttgc tgctgctgcg     1020
attgctggag ctgaggacga cgtggactta cacgttgctt tgcctgctgt agcttataca     1080
acaactgaat tagcaacagt tggagaaacg cctgaatcag ttaaagaccg taaagatgtt     1140
aaaatttcta gttcccatt tgctgcaaat ggccgtgcca tttcaatgaa tgatacgact     1200
ggtttcttac gttgattac tgaaactaaa gaaggggcct taatcggtgc tcaaatcgtt     1260
ggccctggtg catctgactt gatttctggt ttatcactag cgattgaaaa tggattgact     1320
tctaaagaca tttcattgac tatccaacct cacccaacac ttggtgaagc gattatggat     1380
acagctgaat ggctgatgg cttaccaatt cacgtttaa                             1419
```

```
<210> SEQ ID NO 5
<211> LENGTH: 1311
<212> TYPE: DNA
<213> ORGANISM: Lactococcus lactis

<400> SEQUENCE: 5
atgacagtaa catcagattt cacacaaaaa ctctacgaaa attttgcaga aaatacaaaa      60
ttgcgtgcgg tggaaaatgc cgtgactaaa aatggtttgc tttcatcact cgaagtccgt     120
ggttcacatg cagcaaattt gcctgagttt tcaattgact tgacaaaaga ccctgtaacg     180
aatcaaaaac aatctggtcg ttgctggatg tttgctgctt tgaacacttt ccgtcataaa     240
tttatcaatg aatttaaaac agaggatttt gagttttcac aagcttacac tttcttctgg     300
gataaatatg aaaaatcaaa ctggttcatg aacaaatta ttggtgatat tgaaatggac      360
gatcgtcgtt tgaaattcct tttacaaaca ccacaacaag atggcggcca atgggatatg     420
atggttgcaa tttttgaaaa atatggaatt gttcccaaag ctgtttatcc tgaatcacaa     480
gcttcaagta gctcacgtga attgaatcaa tacttgaata aactactccg tcaagatgct     540
gaaattttgc gttatacaat gagcaaggt ggagatgttg aagcagttaa agaagaactt      600
ttgcaagaag tctttaattt ccttgcggta actttaggtt tgccaccaca aaattttgaa     660
tttgctttcc gtaataaaga taatgaatac aaaaaatttg ttggtagtcc aaaagaattt     720
tacaatgaat atgttggaat tgatttgaat aattatgtgt cagtaatcaa tgctccaact     780
gctgacaaac cttataataa gagctacaca gttgagtttc ttggaaatgt tgtcggtggt     840
aaagaagtga acatttgaa tgttgaaatg gaccgcttta aaaaattggc cattgcccaa      900
atgcaagctg gtgaaacagt ttggtttggt tgtgacgtgg gtcaagaatc aaatcgttca     960
gcaggacttt tgacaatgga ttcttatgat ttcaaatctt cattggatat tgaatttact    1020
caaagcaaag caggacgtct tgactatggt gagtcgttga tgacgcatgc catggttta    1080 gcgggtgttg atttagatgc tgacggaaat tcaactaaat ggaaagttga aaattcatgg    1140
ggtaaagatg cgggtcaaaa aggatatttt gttgcctctg atgaatggat ggatgaatat    1200
acttatcaaa ttgttgtccg taaagacctt ttaactgaag aagaattggc tgcttacgaa    1260
gagaaacctc aagtacttct accatgggac ccaatgggtg ctttagctta a            1311

<210> SEQ ID NO 6
<211> LENGTH: 648
<212> TYPE: DNA
<213> ORGANISM: Lactococcus lactis

<400> SEQUENCE: 6
atgaaaaata aaattttaga cctgagggca tattttattg ctggcccaca agattttcca      60
aaactttcaa ttgatgatgc aatcgataaa atttctgtaa tcataaaaag tggagtaacg     120
gtttatcaat tcgtgataaa gggaacaatt tataaaaata aaatcaacg attagaagta      180 gcaaaaagac tacaagaagt agctcagaaa gcggctgttt cttttattgt gaatgatgat     240
gttgaattag cgcgtgaatt gtcagctgac gggattcatg tcggacaaga cgatgattct     300
gtcagtaaaa ttcgtgagct gattggccaa gaaatgtggg taggactttc tgtcagtaat     360
gatatggaat tagaaagcgc tcaaaagagt ggggctgact atttgggaat tggtccaatt     420
tatccaacaa atagcaagtc cgacgcagca gaaccaattg gggttgacca tttaagaaaa     480
atgcttgagc ataatcaatt accaactgtt ggaattggtg aattactga aaattcactg      540 acagagcttt caaaaattgg tctgggtgga gttgcggtaa tttctttgct gacagaatcc     600
```

```
gaaaattaca aaaatatggt tcaaaaaatt aagcaaaata ttagatga           648

<210> SEQ ID NO 7
<211> LENGTH: 1623
<212> TYPE: DNA
<213> ORGANISM: Lactococcus lactis

<400> SEQUENCE: 7
atgaaacaac cactttataa tacaggagtt ttatttaaga ctttaataaa aagggattgg     60
tttaagttag ttttctggat tttaggaatg cttgcttttg ctgcttcagg ggcagggaaa    120
atggaagttg cctcgaatcc ggcgacggct agtactcttt atacaatgtt tgtcaaaaat    180
ccagcaatgg tcggattatt tggaccaact ccaataaata atccaactaa ttatagtctg    240
gggccgattt ttggtcaaac catgacttta attacggggc tgactttcgc tatcatttcg    300
attatttatg ttgttaatcg aagcagaaaa gaagaagatg atgggattac agaactttt    360 cggtcttact ctattggaaa attggcaaat acgactgctt tagtcatgga acttttgctc    420
ttaaatttaa taatggctgt cttattagct cttttcaatag aggtccaaaa cgtggctggc    480
ttgaatcatt tagaaagtaa ttttctattt gctttcacaa caagcgctca gggtttcctt    540
tggggaatgt ttgctttact tttcggtcaa atttctctg aagcaagtac aactaaaggg    600
atgacatttg gtttactggg tttgttatat attgttcgaa tgctaacaga tgtaacaaat    660 cttttccatag gttggttcaa tcctctgtct tggtcttatc tagcttttcc atatgttaaa    720
ggtcatgaaa attggttagc tgtcttttttg acttttctct tagcttttct aattttagga    780
atatcctata ttctagagct taaaagagat gtgggagtgg ggtattttcc cgaaagaaag    840
gcgcgacttc atgggaaaaa gggacatttc ggatttcctg gtctcgtttt gaatcttgaa    900
aaaaagatga ttatcggttg gcttttttggca gttttttgttc tgggcttagt ttatggttca    960
atgtttggac aaatggacca atttatttca gtaataaaaa ccgttaagga gcttttgtt    1020 gggaatgaaa cggcagcgag tgcgattaga ggaaacttca tggtcactct gttttcgata    1080
ttgtcaatct aatcgcagc gtttggtgta attttactga caaaaatggt gagcgaggaa    1140
agaaaaaatc gtctggaagc tctttatgct ttaccacttt cacgactaaa agtgtattcc    1200
acttatttac tgatagctat tctgtcagta attttagctc agttttttagc gcttttttgga    1260 atatttattg aacagttggg taataaaaat gctttgagct tcttagaaat tatgaaatct    1320
ggcatgattt ggcttgttgc tgtcatattt gttttagcaa tacttagtct gttacttggg    1380
cttgtgcctc gtttggcaga attaattttgg gtatatcttg ctttcttact tttatgact    1440 tatcttggaa aattattatc tttgccaaaa tggcttgaaa atttaagcat ttataactat    1500
attcctaaat tgccagttga gaaaatgaat cttcctaccg ttttattcat attaattta    1560 tctgtcttct tagtttttact tggctttgga gcttatagaa gacgcgattt aatcacgggg    1620
taa                                                              1623

<210> SEQ ID NO 8
<211> LENGTH: 1116
<212> TYPE: DNA
<213> ORGANISM: Lactococcus lactis

<400> SEQUENCE: 8
atggctttaa cagcaggtat cgttggttta ccaaacgttg gtaaatcaac tcttttttaat     60 gcaattacaa aagcaggcgc agaagctgca aactatcctt ttgcaacaat tgacccaaat    120
gttgggatgg tagaagtacc ggatgaacgt ttaaacaagt taacagagtt gattaaacct    180
```

```
aagaaaactg ttccgacaac ttttgaattt acagatattg ctgggattgt taaaggggct    240
tcacgcggag aaggtctagg aaataaattt cttgccaata ttcgtgaagt agatgccatc    300
attcacgttg ttcgagcttt tgatgatgaa aatgtaatgc gtgaaaataa tcgtgaagat    360 gctttattg atccaatggc agacattgaa acaattaatc ttgaattaat tttggccgat    420
ttagaatcag tcaataaacg ttatgcgcgt gttgaaaaag ttgctcgtac ggcaaaagat    480
aaagatgcgg tcgcagaatt taatgttttg aaaaagctca aaccggtact tgaagatggt    540
aaatcagcac gaacaattga ctttgacgaa gatgaaataa aggttcttaa aagcttgttc    600
ttattgacaa gtaaaccagt tctttatgta gctaatgttt cagaagatga agtaggcgaa    660
cctgataata tcgaatacgt gaaacaaatt cgtgagtttg cggcgactga aaatgctgaa    720
gttgctgtga tttctgctcg tgttaagaa gaaatctcag agttgaaga tgatgaaaaa    780 gcagaatttt tggaagcaat tggcttaaaa gaatctggtg ttgatatgtt gactcgtgca    840
gcttaccacc ttcttggact tgccacttac tttactgctg tgaaaaaga agtccgtgct    900 tggaccttca agcgtggaat gaaagctcca caaatggcag gaattattca tacagacttt    960
gaaaaaggct ttatccgcgc agtaactatg tcttatgatg atttgcttaa atacggttca   1020
gaaaaagctg ttcgtgaagc cggtcgcttg cgtgaagaag gaaaagaata tgttggtcaa   1080
gatggcgaca ttatggaatt ccgtttcaac gtgtaa                             1116

<210> SEQ ID NO 9
<211> LENGTH: 411
<212> TYPE: DNA
<213> ORGANISM: Lactococcus lactis

<400> SEQUENCE: 9
atggatcgtt atactaaaaa agtcattgct tgggatttag aaagcgaat gactctagaa     60 ttagtgcaaa ggactttgaa taaggcaatg gaatcacaaa attatccaga agctgtgatg    120
cttcattctg accaaggaag tcagtatacg agtcatgagt atgaagagac aataaaaaac    180
tctggaatga ctcactcctt cagtcgtaag ggctatcctt atcataatgc cagtcttgaa    240
tcttggcatg acatttaaa aagagagtgg gtgtatcaat ttaaatataa gaactttgaa    300
gaagcctatc agagtatttt ctggtacatc gaagcctttt ataattcaaa acgaatccat    360
caaagtttag ggtatcttac gcctaatcaa tttgaaaaag aaatcactta a             411

<210> SEQ ID NO 10
<211> LENGTH: 645
<212> TYPE: DNA
<213> ORGANISM: Lactococcus lactis

<400> SEQUENCE: 10
atgataagaa gtgaatgtct caaattaaaa aatagcttag ggtttatttt agttttctc      60 tttactttat tagagctttt aacggttcct atttatttag cttttggaag aagtcatgtt    120
tcaatgactg atttatcgct catgattttt ttgtttttc cgttactggt tacaattttg    180
tctattctaa tctttgaaca ggagagtctg gccaatcgtt tccaagaaat aaatgtaaat    240
aaaaaaagta gcagaatttg gttatcaaag ctaatagtag tggatttcct tttgttcttt    300
ccatcagcaa tgatctggat aattacggga gtttcacagg cagtagggca acaaggaatg    360
atgatcgcaa cagctagctg gttgatggca attttttctta tcatttttca tcttttattg    420
acctttataa tcaatcgagg agggagcatg attatcgcga ttattgaaat attactcatt    480
```

```
attttttgcca gtaataaagt tttattagca gcttattggt gtcccattgc tttacctgtt      540
aattttatga taactgggcg gtgtgcttat ctgatagctg ccgtagggtg gattgtttta      600
tccacaataa ttcttgtagc attatctaaa aaaaagatta gataa                      645
```

```
<210> SEQ ID NO 11
<211> LENGTH: 729
<212> TYPE: DNA
<213> ORGANISM: Lactococcus lactis

<400> SEQUENCE: 11
atgaaaagaa taatagcatc agaagcaata aaattaaaaa aatcaggaac tcttagattg       60
gtattaatta tccctttttgt gactctattt atagcatttc ttatgggtgg aatacagatt    120
tttagtgttt tttcaattta ttggtgggaa actggttttt tattccttttt gatgagtttg    180 cttttttcttt atgatataaa atcagaggag caagctggaa attttcaaaa tgtgaaatgg    240
aaaaagctga gttggaaaat tcatttggcc aaaatgttgt tgatttggct aagaggtata    300
ctagcgagca tagtcttgat tattttgctt tatttggttc ttttgtgtt tcaaggtatt     360 gtagtggtgg attttatgaa agtaagtgtg gcattgattg ctatattact agcagcttct    420
tggaatttac ccttttatata cttgattttc aagtggatta atacttacgt attgttagct   480 gcgaataccct tgatttgttt aattgttgcc cctttttgttg cacaaactcc agtatggttc  540
ttgctaccat acacttatca ctataaagtt acagaaagtt tgttaaatat caaaccatca    600
ggagatttgt taacagggaa gataaatttc agtatttggg aagttttatt accatttgga    660 cttttccatag ttgtaacgat aggagtttcg tatttactta aggagtgat agaacatgat   720 aagaagtga                                                             729
```

```
<210> SEQ ID NO 12
<211> LENGTH: 678
<212> TYPE: DNA
<213> ORGANISM: Lactococcus lactis

<400> SEQUENCE: 12
atgcaggtaa aaattcaaaa tcttttctaaa acatataaag aaaagcaggt gctacaagat     60
atcagttttg atattaaatc tggaacagtc tgtggtttat taggagttaa cggtgcagga    120
aaatcaactt tgatgaaaat tttgtttggt ttaatttctg cagatactgg aaaaattttt    180
tttgatggac aagaaaagac aaataatcaa cttggagcct aatcgaggc tccagcaata    240 tatatgaatt tatctgcttt cgataatctt aaaactaagg ctttgctttt tggaatttca    300
gataagagaa ttcatgaaac tctagaagtg attggtttgg cagaaacagg aagaaaaga    360 gcaggaaaat tctcttttagg gatgaaacaa cgtttgggaa ttggtatggc tattcttaca   420
gaacctcaat ttttaattct tgatgaacct actaatggtt tggatcctga tggtattgcg    480
gagttgttaa acttaatctt aaaacttaaa gctaaaggtg tgacaatctt gatttctagt   540
catcagttgc acgaaataag taagtagct agtcaaatta ttattttgaa caaaggtaag  600
attcgttata atcgtgcgaa caataaagaa gacgacattg aacagttatt ctttaagatt    660
gtgcatggag gaatgtga                                                   678
```

```
<210> SEQ ID NO 13
<211> LENGTH: 687
<212> TYPE: DNA
<213> ORGANISM: Lactococcus lactis

<400> SEQUENCE: 13
```

```
gtgtataaaa ttttaatagt tgatgatgat caggaaattt taaaattaat gaagacagca      60
ttagaaatga gaaactatga agttgcgacg catcaaaaca tttcacttcc cttggatatt     120
actgattttc agggatttga tttgattttg ttagatatca tgatgtcaaa tattgaaggg     180
acagaaattt gtaaaggat tcgcagagaa atatcaactc caattatctt tgttagtgcg      240
aaagatacag aagaggatat tataaacggc ttaggtattg gtgggatga ctatattact      300 aagcctttta gccttaaaca gttggttgca aaagtggaag caaatataaa gcgagaggaa     360
cgcaataaac atgcagttca tgttttttca gagattcgta gagatttagg accaattaca     420
ttttatttag aagaaaggcg agtctgtgtc aatggtcaaa caattccact gacttgtcgt     480
gaatacgata ttcttgaatt actatcacaa cgaacttcta aagtttatac gagagaggat     540
atttatgatg acgtatatga tgaatattct aatgcactt ttcggtcaat ctcggagtat      600
atttatcaga ttaggagtaa gtttgcacca tacgatatta atccgataaa aacggttcgg     660
ggacttgggt atcagtggca tgggtaa                                         687

<210> SEQ ID NO 14
<211> LENGTH: 1344
<212> TYPE: DNA
<213> ORGANISM: Lactococcus lactis

<400> SEQUENCE: 14
atgggtaaaa atattcaat gcgtcgacgg atatggcaag ctgtcattga aattatcata      60
ggtacttgtc tacttatcct gttgttactg ggcttgactt tctttctacg acaaattgga    120
caaatcagtg gttcagaaac tattcgttta tctttagatt cagataattt aactatttct    180
gatatcgaac gtgatatgaa acactaccca tatgattata ttattttga caatgataca    240 agtaaaattt tgggaggaca ttatgtcaag tcggatgtac ctagttttgt agcttcaaaa    300
cagtcttcac ataatattac agaaggagaa attacttata cttattcaag caataagcat    360
ttttcagttg ttttaagaca aacagtatg cctgaattta caaatcatac gcttcgttca    420
atttcttata tcaatttac ttaccttttc tttttctttg gtgaaataat actcattatt     480
ttttctgtct atcatctcat tagagaattt tctaagaatt ttcaagccgt tcaaaagatt    540
gcattgaaga tggggaaat aactactttt cctgaacaag aggaatcaaa attattgaa     600 tttgatcagg ttctgaataa cttatattcg aaaagtaagg agttagcttt ccttattgaa    660
gcggagcgtc atgaaaaaca tgatttatcc ttccaggttg ctgcactttc acatgatgtt    720
aagacacctt taacagtatt aaaaggaaat attgaactgc tagagatgac tgaagtaaat    780
gaacaacaag ctgattttat tgagtcaatg aaaaatagtt tgactgtttt tgacaagtat    840
tttaacacaa tgattagtta tacaaaaactt ttgaatgatg aaaatgatta caaagcgaca    900
atctccctgg aggatttttt gatagattta tcagttgagt tggaagagtt gtcaacaact    960
tatcaagtgg attatcagct agttaaaaaa acagatttaa ccacttttta cggaaataca   1020
ttagctttaa gtcgagcact tatcaatatc tttgttaatg cctgtcagta tgctaaagag   1080
ggtgaaaaaa tagtcagttt gagtatttat gatgatgaaa aatatctcta ttttgaaatc   1140
tggaataatg gtcatccttt ttctgaacaa gcaaaaaaaa atgctggaaa actatttttc   1200
acagaagata ctggacgtag tgggaaacac tatgggattg gactatcttt tgctcaaggt   1260
gtagctttaa aacatcaagg aaacttaatt ctcagtaatc ctcaaaaagg tggggcagaa   1320
gttatcctaa aaataaaaaa gtaa                                          1344
```

<210> SEQ ID NO 15
<211> LENGTH: 2010
<212> TYPE: DNA
<213> ORGANISM: Lactococcus lactis

<400> SEQUENCE: 15

| | | | | | |
|---|---|---|---|---|---|
| ttgggtttat | cagcaactgt | gcatggggag | acaacaaatt | cacaacagtt | actctcaaat | 60 |
| aatattaata | cggaattaat | taatcataat | tctaatgcaa | ttttatcttc | aacagaggga | 120 |
| tcaacgactg | attcgattaa | tctaggggcg | cagtcacctg | cagtaaaatc | gacaacaagg | 180 |
| actgaattgg | atgtaactgg | tgctgctaaa | actttattac | agacatcagc | tgttcaaaaa | 240 |
| gaaatgaaag | tttcgttgca | agaaactcaa | gttagttctg | aattcagtaa | gagagatagc | 300 |
| gttacaaata | aagaagcagt | tccagtatct | aaggatgagc | tacttgagca | agtgaagta | 360 |
| gtcgtttcaa | catcatcgat | tcaaaaaaat | aaaatcctcg | ataataagaa | gaaaagagct | 420 |
| aacttcgtta | cttcctctcc | gcttattaag | gaaaaaccat | caaattctaa | agatgcatct | 480 |
| ggtgtaattg | ataattctgc | ttctcctcta | tcttatcgta | aagctaagga | agtggtatct | 540 |
| cttagacaac | cttttaaaaaa | tcaaaaagta | gaggcacaac | ctctattgat | aagtaattct | 600 |
| tctgaaaaga | aagcaagtgt | ttatacaaat | tcacatgatt | tttgggatta | tcagtgggat | 660 |
| atgaaatatg | tgacaaataa | tggagaaagc | tatgcgctct | accagccctc | aaagaaaatt | 720 |
| tctgttggaa | ttattgattc | aggaatcatg | aagaacatc | ctgatttgtc | aaatagttta | 780 |
| ggaaattatt | ttaaaaatct | tgttcctaag | ggagggtttg | ataatgaaga | acctgatgaa | 840 |
| actgaaaatc | caagtgatat | tgtcgacaaa | atgggacacg | ggacggaagt | cgcaggtcag | 900 |
| attacagcaa | atggtaatat | tttaggagta | gcaccaggga | ttactgtaaa | tatatacaga | 960 |
| gtatttggtg | aaaatctttc | gaaatcggaa | tgggtagcta | gagcaataag | aagagctgcg | 1020 |
| gatgatggga | acaaggtcat | caatataagt | gctggacagt | atcttatgat | ttcaggatcg | 1080 |
| tatgatgatg | gaacaaatga | ttatcaagag | tatcttaatt | ataagtcagc | aataaattat | 1140 |
| gcaacagcaa | aaggaagtat | tgttgtcgca | gctcttggta | atgatagttt | aaacatacaa | 1200 |
| gataaccaaa | caatgataaa | ctttcttaag | cgtttcagaa | gtataaaggt | tcctggaaaa | 1260 |
| gttgtagatg | caccgagtgt | atttgaggat | gtaatagccg | taggtggaat | agatggttat | 1320 |
| ggtaatattt | ctgattttag | taatattgga | gcggatgcaa | tttatgctcc | tgctggcaca | 1380 |
| acggccaatt | ttaaaaaata | tgggcaagat | aaatttgtca | gtcagggtta | ttatttgaaa | 1440 |
| gattggcttt | ttacaactac | taatactggc | tggtaccaat | atgtttatgg | caactcattt | 1500 |
| gctactccta | agtatctgg | ggcactggca | ttagtagttg | ataaatatgg | aataaagaat | 1560 |
| cctaaccaac | taaaaaggtt | tcttctaatg | aattctccag | aagttaatgg | gaatagagta | 1620 |
| ttgaatattg | ttgatttatt | gaatgggaaa | aataaagctt | ttagcttaga | tacagataaa | 1680 |
| ggtcaggatg | atgctattaa | acataaatcg | atggagaatc | ttaaagagtc | tagggataca | 1740 |
| atgaaacagg | aacaagataa | agaaattcaa | agaaatacaa | ataacaattt | ttctatcaaa | 1800 |
| aatgattttc | ataacatttc | aaaagaagta | atttcagttg | attataatat | taatcaaaaa | 1860 |
| atggctaata | atcgaaattc | gagaggtgct | gtttctgtac | gaagtcaaga | aattttacct | 1920 |
| gttactggag | atggagaaga | ttttttaccg | gctttaggta | tagtgtgtat | ctcaatcctt | 1980 |
| ggtatattga | aaagaaagac | taaaaattga | | | | 2010 |

<210> SEQ ID NO 16
<211> LENGTH: 738

```
<212> TYPE: DNA
<213> ORGANISM: Lactococcus lactis

<400> SEQUENCE: 16
atgagaagat atttaatact tattgtggcc ttaataggga taacaggttt atcagggtgt      60
tatcaaacaa gtcataaaaa ggtgaggttt gacgaaggaa gttatactaa ttttatttat     120
gataataaat cgtatttcgt aactgataag gagattcctc aggagaacgt taacaattcc     180
aaagtaaaat tttataagct gttgattgtt gacatgaaaa gtgagaaact tttatcaagt     240
agcaacaaaa atagtgtgac tttggtctta ataatatttt atgaggcttc tgacaagtcg     300
ctatgtatgg gtattaacga cagatactat aagtacttc cagaaagtga taaggggggcg    360
gtcaaagctt tgagattaca aaactttgat gtgacaagcg atatttctga tgataatttt     420
gttattgata aaaatgattc acgaaaaatt gactatatgg gaaatatttta cagtatatcg    480
gacaccaccg tatctgatga agaattggga gaatatcagg atgtttttagc tgaagtacgt    540
gtgtttgatt cagttagtgg caaaagtatc ccgaggtctg aatgggggag aattgataag     600
gatggttcaa attccaaaca gagtaggacg gaatgggatt atggcgaaat ccattctatt     660
agaggaaaat ctcttactga agcatttgcc gttgagataa atgatgattt taagcttgca     720
acgaaggtag gaaactag                                                   738

<210> SEQ ID NO 17
<211> LENGTH: 1245
<212> TYPE: DNA
<213> ORGANISM: Lactococcus lactis

<400> SEQUENCE: 17
atgaataaaa aaatataaa aagaaatgtt gaaaaaatta ttgctcaatg ggatgagaga      60
actagaaaaa ataaagaaaa cttcgatttc ggagagttga ctctctctac aggattgcct    120
ggtataattt taatgttagc ggagttaaaa aataaagata actcaaagat atatcagaaa    180
aagatagaca attatattga atatattgtt agcaaacttt caacatatgg gcttttaaca    240
ggatcacttt attcgggagc agctggcatt gcattaagta tcctacattt acgagaaagat   300
gacgaaaaat ataagaatct tcttgatagc ctaaatagat atatcgaata tttcgtcaga    360
gaaaaaattg aaggatttaa tttggaaaac attactcctc ctgattatga cgtgattgaa    420
ggtttatctg gatacttttc ctatctatta ttaatcaacg acgagcaata tgatgatttg    480
aaaatactca ttatcaattt tttatcaaat ctgactaaag aaaacaatgg actaatatcg    540
ctttacatca atcggagaa tcagatgtct caatcagaaa gtgagatgta tccactaggc    600
tgtttgaata tgggattagc acatggactt gctggagtgg gctgtatctt agcttatgcc    660
cacataaaag gatatagtaa tgaagcctcg ttgtcagctt tgcaaaaaat tattttttatt    720
tatgaaaagt ttgaacttga aggaaaaaaa cagtttctat ggaaagatgg acttgtagca    780
gatgaattaa aaaagagaa agtaattagg gaagcaagtt tcattagaga tgcatggtgc    840
tatggaggtc caggtattag tctgctatac ttatacggag gattagcact ggataatgac    900
tatttttgtag ataaagcaga aaaaatatta gagtcagcta tgcaaaggaa acttggtatt    960
gattcatata tgatttgcca tggctattct ggtttaatag aaatttgttc tttatttaag   1020
cggctattaa atacaaaaaa gtttgattca tacatggaag aatttaatgt taatagtgag   1080
caaattcttg aagaatacgg agatgaaagt ggcacgggtt tcttgaagg aataagtggc   1140
tgtatactgg tattatcgaa atttgaatat tcaatcaatt ttacttattg gagacaagca   1200
```

```
cttttacttt tgacgattt tttgaaagga gggaagagga aatga                 1245

<210> SEQ ID NO 18
<211> LENGTH: 1803
<212> TYPE: DNA
<213> ORGANISM: Lactococcus lactis

<400> SEQUENCE: 18
atggatgaag tgaaagaatt cacatcaaaa caatttttta atactttact tactcttcca    60
agcaccttga agttaatttt tcagttggaa aaacgttatg caatttattt aattgtgcta   120
aatgctatca cagcttttgt tccgttggct agtctttta tttatcaaga tttaataaac    180
tctgtgctag gttcagggag acatcttatc aatattatta tcatctattt tattgttcaa   240
gtgataacaa cagttctggg acagctgaaa agttatgtta gtggaaaatt tgatatgcga   300 cttttcttaca gtatcaatat gcgcctcatg aggactacct catctcttga attaagtgat   360
tatgagcagg ctgatatgta aatatcata gaaaaagtta ctcaagacag cacttacaag    420 cctttcagc tatttaatgc tatcattgtt gtgctttcat cgtttatctc attgttatct    480
agtctatttt ttattggaac atggaacatt ggggtagcaa ttttactcct tattgttcca   540
gtattatctt tggtactttt tctcagagtg ggacaattag agttttaat ccagtggcag    600 agagcaagtt ctgaaagaga acatggtat attgtatatt tattgactca tgatttttca    660 tttaagaaa tcaagttaaa taatattagc aattacttca ttcataaatt tggaaaatta   720 agaaaggat ttatcaacca agatttagct attgctcgta agaagacata tttcaatatt   780
tttcttgatt tcattttgaa tttgataaat attcttacga tatttgctat gatcctttcg   840
gtaagagcag gaaaacttct tataggtaat ttggtaagtc tcatacaagc tatttctaaa   900
atcaatactt attctcaaac aatgattcaa aatatttaca tcatttataa tactagtttg   960
tttatggaac aacttttga gtttttaaag agagaaagtg tagttcacaa aaaaatagaa   1020
gatactgaaa tatgcaatca acatatagga actgttaaag taattaattt atcatatgtt   1080
taccctaatt cgaatgcctt tgcactaaag aatatcaatt tatcctttga aaaggagaa   1140 ttaactgcta ttgtaggaaa aaatggttca gggaaaagta cactagtaaa gataatttca   1200
ggattatatc aaccaactat gggaataatc caatacgaca aaatgagaag tagtttgatg   1260
cctgaggagt tttatcagaa aaacatatcg gtgctgttcc aagattttgt gaagtatgag   1320
ttaacgataa gagagaatat aggattgagt gatttgtctt ctcaatggga agatgagaaa   1380
attattaaag tactagataa tttaggactc gattttttga aaactaataa tcaatatgta   1440
cttgatacgc agttaggaaa ttggtttcaa gaagggcatc aactttcagg aggtcagtgg   1500
caaaaaattg cattagcaag gacattcttt aagaaagctt caatttatat tttagatgaa   1560
ccaagtgctg cactcgatcc tgtagctgaa aaagaaatat tgattatttt tgttgctctt   1620
tcggaaaata atatttcaat tttcatttct catagtttga atgctgccag aaaagcaaat   1680
aaaatcgtgg ttatgaaaga tggacaggtc gaagatgttg gaagtcatga tgtccttctg   1740
agaagatgtc aatactatca gaactttat tattcagagc aatatgagga taatgatgaa   1800
taa                                                                1803

<210> SEQ ID NO 19
<211> LENGTH: 2982
<212> TYPE: DNA
<213> ORGANISM: Lactococcus lactis

<400> SEQUENCE: 19
```

```
atgataaaaa gttcatttaa agctcaaccg tttttagtaa gaaatacaat tttatctcca      60
aacgataaac ggagttttac tgaatatact caagtcattg agactgtaag taaaaataaa     120 gttttttgg aacagttact actagctaat cctaaactct atgatgttat gcagaaatat     180
aatgctggtc tgttaaagaa gaaaagggtt aaaaaattat ttgaatctat ttacaagtat     240
tataagagaa gttatttacg atcaactcca tttggattat ttagtgaaac ttcaattggt     300
gttttttcga aaagttcaca gtacaagtta atgggaaaga ctacaaaggg tataagattg     360
gatactcagt ggttgattcg cctagttcat aaaatggaag tagatttctc aaaaaagtta     420
tcatttacta gaaataatgc aaattataag tttggagatc gagttttca agtttatacc     480 ataaatagta gtgagcttga agaagtaaat attaaatata cgaatgttta tcaaattatt     540
tctgaatttt gtgagaatga ctatcaaaaa tatgaagata tttgtgaaac tgtaacgctt     600
tgctatggag acgaatatag agaactatcg gaacaatatc ttggtagtct gatagttaat     660
cattatttga tctctaattt acaaaaagat ttgttgtcag attttcttg gaacactttt     720 ttgactaaag ttgaagcaat agatgaagat aaaaaatata taattcctct gaaaaaagtt     780
caaaagttta ttcaagaata ctcagaaata gaaattggtg aaggtattga gaaactgaaa     840
gaaatatatc aggaaatgtc acaaattctt gagaatgata attatattca aattgattta     900
attagtgata gtgaaataaa ttttgatgtt aaacaaaagc aacaattaga acatttagct     960 gagttttag gaaatacgac aaaatctgta agaagaacat atttggatga ctataaggat    1020
aaatttatcg aaaaatatgg tgtagatcaa gaagtacaaa taacagaatt atttgattct    1080
acatttggca taggagctcc atataattat aatcatcctc gaaatgactt ttatgagtcc    1140
gaaccgagta ctctatacta ttcagaagag gagagaaaa agtacctcag catgtatgta    1200
gaagccgtta aaaatcataa tgtaattaat cttgacgact tagagtctca ttatcaaaaa    1260
atggacttag aaaagaaaag tgaacttcaa gggttagaat tattttttgaa tttggcaaag    1320 gagtatgaaa aagatatttt tatttaggg gatatcgttg gaaataataa tttgggaggg    1380
gcatcaggta gattttctgc actctctccg gagttaacaa gttatcatag aacgatagta    1440
gattctgtcg aaagagaaaa tgagaataaa gaaattcat cgtgtgaaat agtatttctt    1500
ccagaaaata tcagacatgc taacgttatg catacatcaa ttatgaggag gaaagtactt    1560
ccatttttta caagtacaag tcacaatgaa gttctgttaa ctaatatcta tattggaata    1620
gacgaaaaag aaaaatttta tgcacgagac atttcaactc aagaggtatt gaaattctac    1680
attacaagca tgtacaataa aacgttattc agtaatgagc taagatttct ttacgaaatt    1740
tcattagatg acaagtttgg taatttacct tgggaactta tttacagaga ctttgattat    1800
attccacgtt tagtatttga cgaaatagta atatctcctg ctaaatggaa aatttgggga    1860
agggatgtaa atagtaagat gacaataaga gaacttattc aaagcaaaga aattcccaaa    1920
gagttttata ttgtcaatgg agataataaa gtttatttat cacaggaaaa cccattggat    1980
atggaaattt tagagtcggc gataaagaag agctcaaaaa gaaaagattt tatagagcta    2040
caagaatatt ttgaagatga aaatatcata aataaaggag aaaaggggag agttgccgat    2100
gttgtagtgc ttttattag aacgagagca ttaggtaatg aagggagagc atttataaga    2160
gagaaaagag tttcggttga acggcgtgaa aaattgccct ttaacgagtg gctttatcta    2220
aagttgtaca tttctataaa tcgtcaaaat gaattttac tgtcgtatct tccagatatt    2280
cagaaaatag tagcaaacct gggtggaaat ctattcttcc taagatatac tgatcctaaa    2340
```

```
ccacatatta gattgcgtat aaaatgttca gatttatttt tagcttacgg atctattctt    2400
gaaatcttaa aaaggagtcg gaaaaatagg ataatgtcaa cttttgatat ttctatttat    2460
gatcaagaag tagaaagata tggtggattt gatactttag agttatccga agcaatattt    2520
tgtgccgatt ctaaaattat tccaaatttg cttacattga taaagatac taataatgat     2580 tggaaagtcg atgatgtatc aatcttggtg aattatttat atctgaaatg cttctttcag    2640
aatgataaca aaaagattct taattttttg aatttagtta gtcctaaaaa ggttaaagaa    2700
aatgtcaatg aaaagattga acattatctt aagcttctga agttaataa tctaggtgac     2760 caaattttt atgacaagaa ttttaaagaa ttaaagcatg ccataaaaaa tttatttta      2820 aaaatgatag ctcaagattt tgaacttcag aaagtttatt caattattga cagtatcatt    2880
catgtccata taaccgact aattggtatt gaacgagata agagaaatt aatttattac      2940 acacttcaaa ggttgtttgt ttcggaagaa tacatgaaat ga                       2982
```

<210> SEQ ID NO 20
<211> LENGTH: 57
<212> TYPE: PRT
<213> ORGANISM: Lactococcus lactis

<400> SEQUENCE: 20

Met Ser Thr Lys Asp Phe Asn Leu Asp Leu Val Ser Val Ser Lys Lys
1               5                   10                  15

Asp Ser Gly Ala Ser Pro Arg Ile Thr Ser Ile Ser Leu Cys Thr Pro
            20                  25                  30

Gly Cys Lys Thr Gly Ala Leu Met Gly Cys Asn Met Lys Thr Ala Thr
        35                  40                  45

Cys His Cys Ser Ile His Val Ser Lys
    50                  55

<210> SEQ ID NO 21
<211> LENGTH: 318
<212> TYPE: DNA
<213> ORGANISM: Lactococcus lactis

<400> SEQUENCE: 21

```
atgaatgatt tattttatca tcggctaaag gaactagttg aatcaagtgg taaatctgca    60
aatcaaatag aaagggaatt gggttaccct agaaattctt tgaataatta aagttgggga    120
ggagaaccct ctgggacaag attaatagga ctatcagagt attttaatgt gtctccaaaa    180
tatctgatgg gtataattga tgagcctaat gacagttctg caattaatct ttttaaaact    240
ctaactcaag aagagaaaaa agaaatgttt ataatttgtc aaaaatggct tttttagaa    300 tatcaaatag agttataa                                                  318
```

<210> SEQ ID NO 22
<211> LENGTH: 768
<212> TYPE: DNA
<213> ORGANISM: Lactococcus lactis

<400> SEQUENCE: 22

```
atgatgaaaa aaggaatttt tgtaattact atagtgatat ctatagcatt gataattgga    60
ggtttttata gttataattc taggataaat aatctttcaa aagctgataa aggaaaagaa    120
gttgtaaaaa atagcagtga aaaaaatcag atagacctta cctataaaaa gtattataaa    180
aatttaccaa aatcagttca aaataaaata gatgatattt catccaaaaa taagaagtt     240 acttttaactt gtatttggca atctgattca gttatttctg aacaatttca acaaaactta    300
```

```
caaaaatatt atggaaataa gttttggaac atcaaaaata tcacttacaa tggcgaaact    360
agtgaacaat tattggctga aaaagttgaa aaccaagtat tagccactaa tcctgatgtt    420
gttttatatg aagctccact ttttaatgat aaccaaaaca ttgaagcaac agcctcactg    480
actagtaatg agcaacttat aacaaatttg gctagtgcag gagcggaggt aatagttcaa    540
ccctctccac cgatttatgg tggtgttgtg taccccgtac aagaagaaca gtttaaacaa    600
tctttatcta caaagtatcc ctatatagac tactgggcta gttacccaga caaaaattct    660
gatgaaatga aggggctgtt ttctgatgat ggagtatata aacattaaa tgcttcgggg    720 aataaggttt ggctagatta tattactaaa tattttacag caaactaa              768
```

```
<210> SEQ ID NO 23
<211> LENGTH: 780
<212> TYPE: DNA
<213> ORGANISM: Lactococcus lactis

<400> SEQUENCE: 23
atgcaggaaa cacaggaaca gacgattgat ttaagaggga ttttaaaat tattcgcaaa    60 aggttaggtt taatattatt tagtgcttta atagtcacaa tattagggag catctacaca    120 tttttatag cctccccagt ttacacagcc tcaactcaac ttgtcgttaa actaccaaat    180
tcggataatt cagcagccta cgctggacaa gtgaccggga atattcaaat ggcgaacaca    240
attaaccaag ttattgttag tccagtcatt ttagataaag ttcaaagtaa tttaaatcta    300
tctgatgact ctttccaaaa acaagttaca gcagcaaatc aaacaaattc acaagttatt    360
acgcttactg ttaaatattc taatccttac attgcacaaa agattgcaga cgagactgct    420
aaaatattta gttcagacgc accgaaacta ttgaatgtta ctaacgttaa tattctatcc    480
aaagcaaaag ctcaaacaac accaattagt cctaaaccta aattgtattt agcgatatct    540
gttatagtcg gactagtttt aggtttagcc attgctttat tgaaagaatt gtttgataac    600
aaaattaata agaagaaga tattgaagct ctggggctca cggttcttgg tgtaacaacc    660
tatgctcaaa tgagtgattt taataagaat acaaataaaa atggcacgca atcgggaact    720
aagtcaagtc cgcctagcga ccatgaagta aatagatcat caaaaaggaa taaaagatag    780
```

```
<210> SEQ ID NO 24
<211> LENGTH: 696
<212> TYPE: DNA
<213> ORGANISM: Lactococcus lactis

<400> SEQUENCE: 24
atggctaaaa ataaaagaag catagacaac aatcgttata ttattaccag tgtcaatcct    60
caatcaccta tttctgaaca atatcgtacg attcgtacga ccattgattt taaaatggcg    120
gatcaaggga ttaaaagttt tctagtaaca tcttcagaag cagctgcagg taaatcaacc    180
gcgagtgcta atatagctgt tgcttttgca caacaaggta aaaaagtact tttaattgat    240
ggtgatcttc gtaaaccgac tgttaacatt acttttaaag tacaaaatag agtagggtta    300
accaatattt taatgcatca atcttcgatt gaagatgcca tacaagggac aagactttct    360
gaaaatctta caataattac ctctggtcca attccaccta atccatcgga attattagca    420
tctagtgcaa tgaagaattt gattgactct gtgtccgatt tctttgatgt tgttttgatt    480
gatactccac ctctctctgc agttactgat gctcaaattt tgagtagtta tgtaggagga    540
gtggttcttg ttgtacgtgc ctatgaaaca aaaaaagaga gtttagcaaa aacaaaaaaa    600
```
atgctggaac aagttaatgc aaatatttta ggagttgttt tgcatggggt agactcttct      660
gactcaccgt cgtattacta ctacggagta gagtaa      696

<210> SEQ ID NO 25
<211> LENGTH: 687
<212> TYPE: DNA
<213> ORGANISM: Lactococcus lactis

<400> SEQUENCE: 25
atggaatttt ttgaggatgc ctcatcacct gaatcggaag agcctaagtt agtagaatta       60 aaaaatttt cttatagaga gctaattata aaaagagcaa ttgatatcct aggaggatta      120
gcaggttcag ttttatttct tattgcggct gcattgcttt atgtgcctta caaaatgagc      180
tcaaaaaaag atcaagggcc aatgttctat aaacaaaaac ggtatggaaa aaacggtaaa      240
attttttata ttttgaaatt tagaacaatg attcttaatg ccgagcagta tctagaactt      300
aatccagatg ttaaagctgc ttaccatgcc aacggcaata agctagaaaa cgatccacgg      360
gtaacgaaga ttggctcatt tataagacga cactcaattg atgaactgcc acaatttatc      420
aatgttctta aaggggatat ggcattggtt ggcccaagac caattttgct ttttgaagcg      480
aaagaatatg gggagcgcct ctcttactta ctcatgtgta aacctggaat tactggttat      540
tggacaacac atggtcgaag taagttctt tttcctcaac gagcagattt agaactctat      600
tacctccagt accatagtac caaaaacgat atcaagcttc tagtactcac aattgtacaa      660
agtattaacg gatcggacgc atattaa      687

<210> SEQ ID NO 26
<211> LENGTH: 765
<212> TYPE: DNA
<213> ORGANISM: Lactococcus lactis

<400> SEQUENCE: 26
atgattgata ttcattgcca tattttaccg ggtatagatg atggagctaa aacttctgga       60
gatactctga caatgctgaa atcagcaatt gatgaaggga taacaactat cactgctact      120
cctcatcata atcctcaatt taataatgaa tcaccactta ttttgaaaaa agttaaggaa      180
gttcaaaata tcattgacga acatcaatta ccaattgaag ttttacccgg acaagaggtg      240
agaatatatg gtgatttatt aaaagaattt tctgaaggaa agttactgac agcagcgggc      300
acttcaagtt atatattgat tgaatttcca tcaaatcatg tgccagctta tgctaaagaa      360
cttttttata atattcaatt ggagggactt caacctattt tggtccaccc tgagcgtaat      420
agcggaatca ttgagaaccc tgatatatta tttgatttta ttgaacaagg agtactaagt      480
cagataacag cttcaagtgt cactggtcat tttggtaaaa aaatacaaaa gctgtcattt      540
aaaatgatag aaaaccatct tacgcatttt gttgcatcag atgcgcataa tgtgacgtca      600
cgtgcattta agatgaagga agcgtttgaa attattgaag atagttatgg ttctgatgta      660
tcacgaatgt ttcaaaataa tgcagagtca gtgatttaa acgaaagttt ttatcaagaa      720
aaaccaacaa agatcaaaac aaagaaattt ttaggattat tttaa      765

<210> SEQ ID NO 27
<211> LENGTH: 450
<212> TYPE: DNA
<213> ORGANISM: Lactococcus lactis

<400> SEQUENCE: 27
atgaaaatag cattagtagg ttccagcggt ggccatttga cacacctgta tttgttaaaa       60

```
aagttttggg aaaacgaaga tagattttgg gtcacatttg ataaagcaga tgcaaaatct    120
atattgaaag aagaaagatt ttatccttgt tattatccca caaatagaaa tgtaaaaaac    180
acgataaaaa ataccattct tgcatttaaa atacttagaa aagaaaaacc agatttgatt    240
atttcgagtg gtgctgcggt agccgttcct ttttttttggt taggtaaaact attcggtgca   300 aagacagtct atattgaaat atttgaccgg atcgataaac caaccttaac aggaaaatta    360
gtttatccag ttactgataa gtttatagtt caatgggaag agttaaaaaa agtttaccct    420
aaagcaatta atttaggagg aattttctaa                                     450

<210> SEQ ID NO 28
<211> LENGTH: 507
<212> TYPE: DNA
<213> ORGANISM: Lactococcus lactis

<400> SEQUENCE: 28 atgattttg taacggttgg aactcacgaa caaccattta atcgactcat tcaaaaaatt      60
gatgaacttg tacgcgatgg tgaaatcgaa gacgatgtat tcatgcaaat tgggtactca   120
acttatgaac ccaaatatac taaatgggaa aaggttattg gatatgagac tatggaaaga   180
tgtatgaatg aagcgagtac gattattact catggcggac catctaccta tgcaagta    240 ttacaactag gtaaaattcc gatagttgtt ccacggcaaa tgaaatttga tgagcatata   300
aatgatcatc aaatttgggt aagtaaacag gttgtgaaaa agggatactc attgattttg   360
tgcgaagatg ttgaagacat tctcgaaaat attattagct ccaaaatttc agataccttā   420 caaaaaatg taaatcacaa cactgaattc ataaaattat tcagtgctga aatttaccag   480
ctatttataa aaagtgagaa gatatga                                       507

<210> SEQ ID NO 29
<211> LENGTH: 987
<212> TYPE: DNA
<213> ORGANISM: Lactococcus lactis

<400> SEQUENCE: 29
atggttaaat tttctataat tattccagta tataacttag aagattattt atatcgctgt      60
ttagaatctg ttctcaatca agattataat gattttgaga ttatacttat taatgatggt   120
tcagatgata attcacttaa tattatcgaa gaatttaaaa atcaatattc tagtaaaata   180
aaagtaattt ctcaagtgaa tcaaggagta tcatcagcaa gaaataaggg acttcaagaa   240
gctgaagggg agtatataat ttttatagat ggggatgact acattgatag taatcattta   300
agtaatattc ttgaatatat aggaaaatca aaaaattcct ttattctaaa tagtctatt   360 gtagagaccg gggaaactac ttgggttatt cccaaagcaa gtaagaatta tgattgtagt   420 tttatggaa ctcttatgaa tattttagat aatcatagat atcaaggctt tttgtttaat   480
aaaatattta gtaattcagt aataaaaagt aatgaattga agtttaaaga aaatttatat   540
tatgcggaag atacggagtt tgttattcga tacctttggg agttgcaaaa gagagaatcg   600
gatttagttg ctaatataat taattctcca acatatcatt atgttcaaat aaaaagtagt   660
gctactcacc aatttaatat cagacaattt tctctagtaa attctatgga ggaaattcaa   720
tgtaatctag aaaaaatgaa atcaataaat aaagaagttt tgtatgtagt acaatcaaat   780
ttaattcagt cagtattgaa aatgataaga ttatctagaa taaatggtgt agttaatgaa   840
catttggaag attcattaga taaatcgta acaaattcat gggataatat tgaaactatc   900
```
tggaaatctc aaagaaagat ttactctaag gtatttttaa cactaagaat tattcaggaa    960
aaagttaagg gtaagaaaat caaatag                                        987

<210> SEQ ID NO 30
<211> LENGTH: 867
<212> TYPE: DNA
<213> ORGANISM: Lactococcus lactis

<400> SEQUENCE: 30
gtgataatta tacctatctt aatttttatt acccttatag gagcaggggc ttatgcctta     60
agagattcac ttattcctac tgaacatacg aaaacaaata gttcggatca accgaccaaa    120
acttcggttt ctaacggtta cgtggagcaa aaaggtgaag aagctgctgt gggtagtata    180
gcacttgtag atgacgctgg agtaccagaa tgggttaaag ttccctcaaa ggtaaattta    240
gataaattta ctgatttatc tacgaataat atcactattt atcgaattaa caatccggaa    300
gtcttaaaaa cagttaccga tcgtacggat caacggatga aaatgtcaga agttatagct    360
aagtatccta atactttgat tatgaatgct tccgcttttg atatgcagac aggacaagta    420
gctggatttc aaattaataa tggaaagttg attcaagact ggagtccagg tacaacgact    480
cagtatgctt ttgttattaa caaagatggt tcgtgcaaaa tttatgattc aagtacacct    540
gcttcaacta ttattaaaaa cggagggcaa caagcctatg attttggtac tgcaattatc    600
cgtgatggta aaattcaacc aagtgatggc tcagtagatt ggaagatcca tattttttatt    660 gcgaatgata aagataataa tctctatgct attttgagtg atacaaatgc aggttatgat    720
aatataatga aatcagtgtc aaatttgaag ctccaaaata tgttattact tgatagtggt    780
ggttcaagtc aactatctgt caatggtaaa acgattgttg ctagtcaaga tgatcgagcc    840
gtaccggatt atattgtgat gaaataa                                        867

<210> SEQ ID NO 31
<211> LENGTH: 903
<212> TYPE: DNA
<213> ORGANISM: Lactococcus lactis

<400> SEQUENCE: 31
atgaatcaaa aaagaggcg tcattatcgt aagaaaaaat acacagtact aaaagttatt     60
tcaattattt ttgtattagt aattatttct gttgcttcta tagcctacgt agcttataga    120
aatgttgaat caaccttttc aacatcatat gaaaatttcc ctaaaacaac aagtattgac    180
ttaaaaaaat ctaaaacatt caccacactt atcattgcaa ctggtaaaaa taattctaaa    240
aattcagctt atgctactgt tttagcttca acgaatgtaa agacaaatca aactactttc    300
atgaacttcc cagttttttgc gacactgcct aatcaaaaaa caatcactga gtttacaat    360 acgaatggag atgatggaat tttccagatg gttaaagacc tattgaatgc gtccattaac    420
aaagtaattc agatcgatgt taataaaatg ggatcacttg tacaggccac tggtggaatc    480
accatgcaaa atccaaaggc attcaatgct gaaggttatg agtttaaaca aggaactgtt    540
aatttacaaa ctgctgatca agtccaagcc tatatgacac aaattgacga tactgatttg    600
gatgcttcaa tcactcggat tcaaaatgtc tcaatggaac tctacgtaaa tattaaaaaa    660
attgctcata tgaaaaaact tgaaagtttc aattactatc gagaaattct ctatgctttt    720
tcaaacactg ttaaaaccaa tataagtttc aatgatgcta aaacgatcgt tatgagctac    780
agtaaggctc taaagaatac cagcaagctc aatctacata caacgatgaa aaatggagct    840
aaggtcgttt ctcaaacaga attagactca gtcaaaaccc tttttgaaaa atctctaaaa    900

```
taa                                                                        903

<210> SEQ ID NO 32
<211> LENGTH: 1431
<212> TYPE: DNA
<213> ORGANISM: Lactococcus lactis

<400> SEQUENCE: 32
ttgagtaaca caggaataaa agtaactaat aaccaaatac taataagaaa agtaacagtt    60
atatttttgc ttttttcagg aatttgggta ggagctgcaa caagtttttt tgagatttct   120
ttagtgtttt ctgtattagc tggtattata agctcaaatt tactagaaaa tgaatttgtt   180
ccgtattcag ttattttaat actggttttt caaaatttat tgataggtac tgggtctcat   240
ttaacaggga atctgtcagg tttaacttat ctcactcaag ttccgatggt ttttgtttgg   300
actattaatc tctgtttgaa aaaggtagat aaattatcta aagttgatat ttcttttata   360
gttcttatga tattttcttt gtcatctttg gcatttggac gagggccaat tcaggcaatt   420
atttcgaact aagagatttt atcgacattt tattttactt atcgtatagg taaaagatt   480 atcaaaactg aagaaatatt tgcgaggttt ataaagaaaa ttctttattt aggaatattt   540
gtagttttaa ttggtattat cttatactta ggaggctatc ctctaaacaa attttgggat   600
atagatgaaa tttactacgc taaggggta actactttac ttaataattt tgatggcaga    660
tttggatcag atgtatttgg aatttccgta acacgtatgg gatcaattta ttttgaacca   720
ataaatttgg ggtatttaat attttctatg ctcattatat cctttatttt ctttaatacc   780
caaaaattaa aatatataaa tttatataga ctgatttat tgataggtgg aatgttaact   840
tttgggaaag gtgctatgct tctagctata ggggtgatgg ttgcaggtat cggacataaa   900
ttatttttaa aattcttttc aagaagtaat gaaatgaatg ttttagaaa tcttttata   960 ttgttaacta ttattatgtt tattggtgga aattattatt tcaaaacttt tggaggagct  1020
gtagggaatc acttttatgc aatccaaggg acattggata gtataagtca tcgaccaatt  1080
ggttttggat taggtgtggg aggaaacgcc tcagcagtat ttacaggggg agaacttgat  1140
tttactactg gatcagaaac agccttgtta tcatttgtat accaaatagg tgtacaaggt  1200
gctattgctt taatatgtgt attctacttt atgagtaaag aagtgttgga aaaagtacag  1260
aagaattcac aattcaaaaa tagattttta ttttatgttc caatgatatt gattttgtt   1320 agtatatatc aagctaatac atataccca caatgtataa cgttgttaat gattactttg  1380
ggaggatttg taggaatgag agacaggaga aggaaaaaat ataatggtta a            1431

<210> SEQ ID NO 33
<211> LENGTH: 702
<212> TYPE: DNA
<213> ORGANISM: Lactococcus lactis

<400> SEQUENCE: 33
atgataccaa aagtaataca ctattgctgg ttcggagggc aacctttacc agaatctgcg    60
ctaaaatgta ttgaaagttg gagaaggttt tgtccagatt atgaaataaa acaatggtct   120
gagaaaaact atgatgtaaa taaaattcaa tatacaaaag aagcgtacga aaagaaacgt   180
tatgcttttg tcacggatgt tgcaaggctt gatatcatt atagtgaggg gggcatttat   240
cttgacactg atgttgaact gataaaacct ttgatgatt tgcttgtcaa tcaagcatat   300
atgggaatgg aaactgctgg tcgtgtaaat accggccaag gatttggagc tataaaaaac   360
```

-continued

```
caccaaatag ttaaagcaaa tttagaggtt tatgctgaac ttgagtttga tggtacgact    420
acttgtgtga cttacacaac taatttgtta aaaagatttg gtttacaaaa aaaagatatt    480
aaccaggatt tacaaggaat aactatcctt ccgacagatt atttatgtcc attaagtctt    540
gaaactagga aattagtaat tacagaaaat acattttcta ttcatcacta tgatggtggt    600
tggaaaaaag gaaaagataa atttttatct ctaaaaatta aaattcgacg ctggattggt    660 gataacttt atgagtcgat aaaaacgaag ttgaagggat ag                       702
```

PROCESSED CHEESE WITH CULTURED DAIRY COMPONENTS AND METHOD OF MANUFACTURING

CROSS-REFERENCE TO RELATED APPLICATIONS

This application claims the benefit of U.S. Provisional Application No. 61/692,129, filed Aug. 22, 2012, which is hereby incorporated herein by reference in its entirety.

SUBMISSION OF SEQUENCE LISTING

The Sequence Listing associated with this application is filed in electronic format via EFS-Web and is hereby incorporated into the specification in its entirety. The name of the text file containing the Sequence Listing is "Sequence Listing 1410.131457." The size of the text file is 46 KB, and the text file was created on Aug. 21, 2013.

FIELD

The present application generally relates to processed cheese compositions and methods for manufacture, and more particularly, processed cheese compositions containing cultured dairy components.

BACKGROUND

Processed cheese, widely available in sliced and loaf forms, has become one of the more popular selling cheese products. Processed cheese products are particularly popular with children. Processed cheese is conventionally prepared by heating, grinding and/or mixing one or more varieties of milk-fat containing natural cheeses, such as, for example, Cheddar cheese, Colby cheese, Swiss cheese, Brick cheese, Muenster cheese, pasta filata cheese, washed curd, and granular curd cheese to suggest but a few types. The resulting cheese is then blended with other dairy products, such as non-fat dry milk and whey solids, and emulsifying salts, such as disodium phosphate, at temperatures which are sufficiently elevated to pasteurize the cheese and to produce a homogeneous, pumpable, fluid cheese material that may be formed into sheets, slices, or other desired forms.

It is often desirable to prolong the shelf life of food, such as processed cheese, and/or increase microbiological stability of such food. By increasing the amount of time a food is stable, processors can mitigate inventory losses due to spoiled foodstuffs. Prior methods, such as the use of packaging, preservatives, and/or specific storage parameters (e.g., refrigeration), have been used to stave off spoilage.

In particular, Listeria monocytogenes and C. botulinum can, in some instances, be a concern with foods like as raw milk, cheeses (particularly soft-ripened varieties), ice cream, raw vegetables, fermented raw meat sausages, raw and cooked poultry, raw meats (of all types), and raw and smoked fish. The ability of these pathogens to grow, in some instances, at temperatures as low as 3° C. permits multiplication in refrigerated foods.

Furthermore, while it is desired to provide improved shelf life to foods, such as processed cheese, there also has been an increased desire to provide foods that contain an increased amount of natural ingredients. In this regard, it may be desirable to provide foods which include only natural ingredients or otherwise remove artificial materials. For example, processed cheese oftentimes utilizes preservatives such as sorbic acid to improve food safety and shelf life. It may be desirable to incorporate natural preservatives and/or antimicrobials while maintaining and/or improving the characteristics of the processed cheese.

SUMMARY

In one approach, a processed cheese including natural antimicrobials is provided herein. In one aspect of this approach, the processed cheese includes about 10 to about 90 percent natural cheese or a mixture of natural cheeses; one or more optional emulsifiers; about 8 to about 25 percent protein; and about 10 to about 30 percent fat. The processed cheese also includes an amount of nisin, effective to prevent toxin formation from C. botulinum determined by toxin bioassay with mice, in the processed cheese at the protein and the fat levels thereof for about 9 days at 86° F. At the same time, the processed cheese also includes an amount of exopolysaccharide effective to increase the melt of the processed cheese and increase the firmness of the processed cheese relative to a processed cheese without nisin and exopolysaccharide. In some approaches, the nisin includes nisin A.

The nisin and exopolysaccharide of the processed cheese may also be included in the processed cheese in the form of a cultured dairy component, which may be provided in about 1 to about 20 percent in the processed cheese. The nisin and the exopolysaccharide in the cultured dairy component may also be obtained from a fermentation of a single bacterial strain in a liquid dairy medium, where the bacterial strain is an isolated Lactococcus lactis strain having all of the identifying characteristics of the Lactococcus lactis strain of ATCC PTA-120552.

The processed cheese may include about 1 to about 100 ppm of nisin and about 100 to about 2,000 ppm of the exopolysaccharide, where the nisin and exopolysaccharide may be obtained from a single bacterial strain, where the bacterial strain is an isolated Lactococcus lactis strain having all of the identifying characteristics of the Lactococcus lactis strain of ATCC PTA-120552.

The fermentation of the bacterial strain ATCC PTA-120552 may be conducted in a 2× to a 5× concentrated liquid dairy medium at a temperature of about 25 to about 35° C. and a pH of about 5 to about 6 for about 15 to about 48 hours. The concentrated liquid dairy medium may be a concentrated milk having a total solids of about 5 to about 36 percent, about 1 to about 14 percent protein, and about 0 to about 16 percent fat.

In some approaches, the processed cheese is free of artificial preservatives selected from the group consisting of sorbic acid, potassium sorbate, nitrites, and combinations thereof.

In some approaches, the processed cheese includes nisin A and a bacterial strain having at least one gene from a nisin producing gene cluster with significant homology to the sequences selected from the group consisting of SEQ ID NOS 9 to 19 and at least one gene from an exopolysaccharide producing gene cluster with significant homology to the sequences selected from the group consisting of SEQ ID NOS 21 to 33. In some approaches, the at least one gene from a nisin producing gene cluster and the at least one gene from the exopolysaccharide producing gene cluster are from the same bacterial strain, where the bacterial strain may be an isolated Lactococcus lactis strain having all of the identifying characteristics of the Lactococcus lactis strain of ATCC PTA-120552. The bacterial strain incorporated into the processed cheese product may not be viable due to heat treatment steps in either the process for preparing the cultured dairy component or processed cheese product.

In other aspects, a method of producing a processed cheese having natural antimicrobials is provided. In some approaches, the method includes fermenting a liquid dairy medium with a *Lactococcus lactis* strain to produce a cultured dairy component including nisin and exopolysaccharide. The cultured dairy component is then blended with a natural cheese or mixture of natural cheeses and one or more emulsifiers to produce a processed cheese having about 8 to about 25 percent protein and about 10 to about 20 percent fat. The method is effect to produce processed cheese an amount of nisin, effective to prevent toxin formation from *C. botulinum* determined by toxin bioassay with mice, in the processed cheese at the protein and the fat levels thereof for about 9 days at 86° F. The method is also effective to produce processed cheese with an amount of exopolysaccharide effective to increase the melt of the processed cheese and increase the firmness of the processed cheese relative to a processed cheese without nisin and exopolysaccharide. In some approaches, the nisin includes nisin A.

In other approaches, the nisin and the exopolysaccharide in the cultured dairy component of the method are obtained from the fermentation of the same *Lactococcus lactis* strain in the liquid dairy medium. The *Lactococcus lactis* strain may be an isolated *Lactococcus lactis* strain having all of the identifying characteristics of the *Lactococcus lactis* strain of ATCC PTA-120552. The cultured dairy component used in the method may also include about 1 to about 100 ppm of nisin and about 100 to about 2000 ppm of the exopolysaccharide. The processed cheese may include about 1 to about 20 percent of the cultured dairy component.

The method may include the fermentation of the *Lactococcus lactis* strain ATCC PTA-120552 conducted in a 2× to a 5× concentrated liquid dairy medium at a temperature of about 25 to about 35° C. and a pH of about 5 to about 6 for about 15 to about 48 hours. In some approaches, the concentrated liquid dairy medium is a concentrated milk having a total solids of about 5 to about 36 percent, about 1 to about 14 percent protein, and about 0 to about 16 percent fat.

In other approaches, the method is effective so that the processed cheese is free of artificial preservatives selected from the group consisting of sorbic acid, potassium sorbate, nitrites, and mixtures thereof.

In some approaches, the cultured dairy component of the method includes nisin A and a bacterial strain having at least one gene from a nisin producing gene cluster with significant homology to the sequences selected from the group consisting of SEQ ID NOS 9 to 19 and at least one gene from an exopolysaccharide producing gene cluster with significant homology to the sequences selected from the group consisting of SEQ ID NOS 21 to 33.

In other approaches, the at least one gene from a nisin producing gene cluster and the at least one gene from the exopolysaccharide producing gene cluster in the method are from the same *Lactococcus lactis* strain.

BRIEF DESCRIPTION OF THE DRAWINGS

FIG. 10 is a chart showing the results of a comparative Multi Locus Sequence Typing (MLST) analysis of nisin-producing strains;

FIG. 11 is a chart showing the results of phage typing analysis of nisin-producing strains;

FIG. 13 is a chart comparing the EPS-related genes of various lactic acid bacteria;

DETAILED DESCRIPTION

Figure 1:
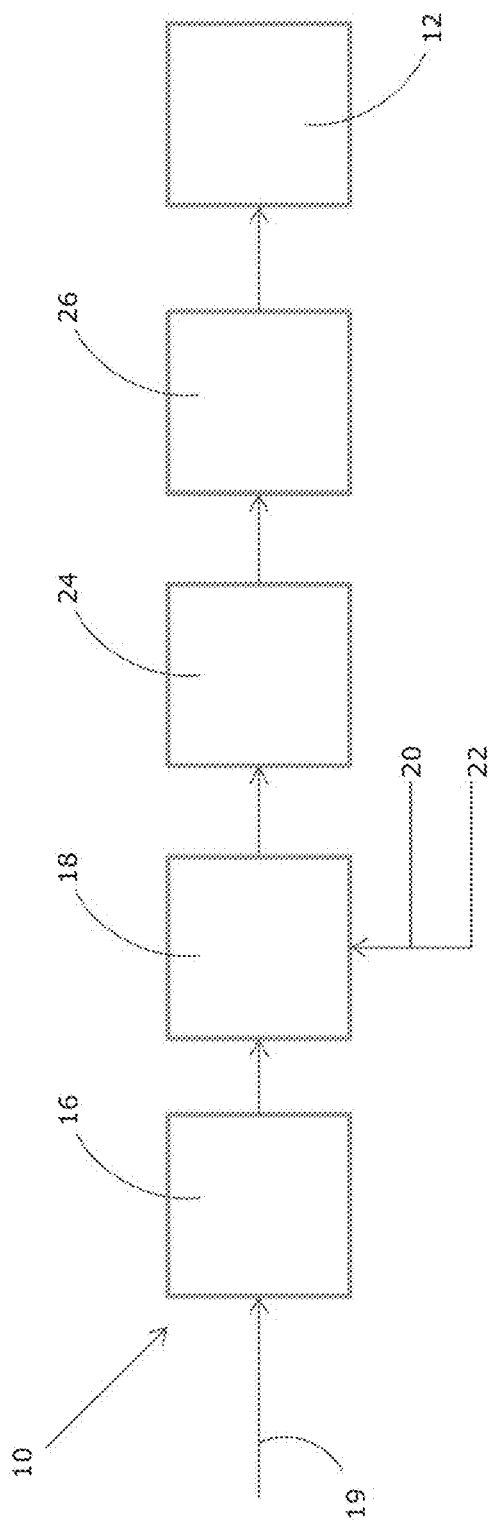
FIG. 1 is a process flow diagram illustrating production of an exemplary cultured dairy component produced from a concentrated dairy liquid.

The present application is generally directed to processed cheese including, among other aspects, natural antimicrobials and natural texture modifying agents. In one form, the natural antimicrobials are incorporated into the processed cheese via cultured dairy components or concentrated cultured dairy components, which include a natural antimicrobial and/or a culture capable of producing a natural antimicrobial under appropriate fermentation conditions. As used herein, the terms "cultured dairy component" or "concentrated cultured dairy component" generally refer to cultured milk substrates or derivatives thereof that have undergone, in some approaches, concentration and fermentation with selected antimicrobial-producing cultures under conditions effective to produce antimicrobials unless specifically identified as not including cultured antimicrobials. As used herein, "natural antimicrobial" refers to a component with antimicrobial activity that is produced by an organism, such as by a bacterial culture during a fermentation process.

In one form, the cultured dairy component includes a dairy substrate fermented with an antimicrobial-producing culture. In some approaches, the dairy substrate is a dairy liquid, such as milk or a concentrated dairy liquid or milk substrate, such as a 2-5× concentrated milk substrate. In one aspect, the antimicrobial-producing culture is a nisin-producing culture. In one particular form, the nisin produced by the culture is nisin A. In one approach, the processed cheeses herein include about 1 to about 100 ppm of nisin, in other approaches, about 1 to about 20 ppm of nisin, in other approaches, about 5 to about 15 ppm of nisin, and in yet other approaches, about 10 to about 15 ppm of nisin.

In some approaches, the cultured dairy component also includes exopolysaccharide (EPS). In one aspect, the EPS is produced during fermentation of the milk substrate under the same conditions and with the same medium used to produce nisin. In another aspect, the EPS is produced by the antimicrobial-producing culture and, in some approaches, from the same bacterial strain used to produce nisin. In this regard, when the cultured dairy component is used in the processed cheeses herein, the processed cheese includes both nisin (such as nisin A) and EPS obtained from the same fermentation, and in some approaches, the same bacterial strain. Along with the nisin discussed above, it is expected that the cultured dairy component includes about 0.1 to about 2 percent of exopolysaccharide, and the final processed cheese includes, in addition to the nisin, about 100 to about 1000 ppm of the exopolysaccharide.

It has been unexpectedly found that a processed cheese including the cultured dairy component herein including both natural antimicrobials (such as nisin) and exopolysaccharide from the same fermentation and/or same bacterial strain has improved antimicrobial properties, improved melt performance, and firmer texture as compared to processed cheese with the same formulation except artificial preservatives and/or other types of prior natural anti-microbials. At the same time, the processed cheese herein including the unique cultured dairy component also exhibits a firmness resembling that of natural cheese. It was unexpected that both increased melt properties and increased firmness could be obtained at the same time in a processed cheese. By one approach, the processed cheeses herein exhibit a firmness (Young's modulus) of about 1500 to about 2500 Pa and, at the same time, exhibit a consistency of about 50,000 to about 70,000 Pa/second. In other approaches, the processed cheese with the cultured dairy components also exhibits an increase in melt of about 20 to about 75% over the same processed cheese but without the cultured dairy component or with sorbic acid or other artificial preservative instead of the cultured dairy component. As used herein, natural cheese refers to unpasteurized cheese made by curdling milk or other dairy liquid using some combination of rennet (or rennet substitute) and acidification. The natural cheese used in the processed cheese described herein may be freshly made or aged.

As discussed more below, prior antimicrobials tended to be less effective in the context of a processed cheese with high levels of protein and fat because it was believed that the levels of protein and fat in processed cheese combined, in some cases, with lower moisture levels tended to protect and/or shield various pathogens from being inhibited by commercial forms of nisin and other natural antimicrobials. It was unexpectedly discovered that the natural antimicrobials of the cultured dairy components herein effectively inhibit C. botulinum and other pathogens at a level not found by prior natural antimicrobials.

Previously, it was expected that when melt performance of processed cheese was improved, it resulted in a decrease in firmness. That is, it was previously expected there was an inverse relationship between melt and firmness. As mentioned above, the processed cheeses herein, on the other hand, achieve an improvement in both melt and texture/firmness at the same time when the cultured dairy components are used. This double improvement in melt and firmness at the same time tended to be opposite to these trends in previous processed cheese applications.

As described herein, the term activity unit ("AU") may be used to describe the biological activity of the natural antimicrobial in the cultured dairy component and processed cheese in which the antimicrobial is incorporated. It should be understood that biological activity may also be expressed in International Units ("IU") such that AU and IU may be used interchangeably. In some approaches, the cultured dairy components of the present disclosure and the processed cheeses prepared therewith may have nisin activity in the processed cheese of about 40 to about 400 IU/gram and, in other approaches, about 50 to about 200 IU/gram.

One or more different natural antimicrobials may be included in the processed cheese. In one form, the processed cheese contains a sufficient amount of natural antimicrobial such that the processed cheese does not contain or is free of artificial preservatives, such as sorbic acid, potassium sorbate and the like. As used herein, the phrases "does not contain," "is free of" or "substantially free of" mean less than about 0.5%, in other approaches, less than about 0.1% and, in some cases, less than about 0.05% and in other cases, none. In some approaches, the processed cheese includes an amount of natural antimicrobial effective to prevent toxin formation for at least about 9 days when the processed cheese is stored at about 86° F. The processed cheese also includes cultured dairy component in an amount effective to prevent more than 1 log of growth of Listeria monocytogenes for at least about 4 weeks, in another aspect at least about 8 weeks, in another aspect at least about 12 weeks, in another aspect at least about 16 weeks, in another aspect at least about 20 weeks, in another aspect at least about 24 weeks, and in yet another aspect at least about 28 weeks, during storage at about 1 to about 10° C.

The natural antimicrobial can be produced by fermentation using an antimicrobial-producing strain of lactic acid bacteria. As used herein, the term "lactic acid bacteria" generally refers to gram-positive bacteria that generate lactic acid as a major metabolite of carbohydrate fermentation. The lactic acid bacteria may be, for example, an antibacterial producing strain of Lactococcus lactis or, in alternative approaches, Brevibacterium linens.

In some aspects, the natural antimicrobial comprises nisin and, in some approaches, nisin A. Nisin is an inhibitory polycyclic peptide with 34 amino acid residues. It contains the uncommon amino acids lanthionine, methyllanthionine, dehydroalanine and dehydro-amino-butyric acid. These amino acids are synthesized by posttranslational modifications. In these reactions a ribosomally synthesized 57-mer is converted to the final peptide. The unsaturated amino acids originate from serine and threonine.

Nisin can be obtained by culturing nisin-producing bacteria on natural substrates, including milk. Nisin has been included in food products to extend the safe, usable life by suppressing gram-positive spoilage and pathogenic bacteria. Due to its highly selective activity, it may also be employed as a selective agent in microbiological media for the isolation of gram-negative bacteria, yeast and molds. Two commercially available antimicrobials containing nisin are Nisaplin® and Novasin™ (both from Daniso A/S, Denmark). Typically, Nisaplin contains less than about 3.0 weight % nisin, the remainder consisting of NaCl, proteins, carbohydrates and moisture. When referring to a nisin component herein the component may include not only nisin, but also other ingredients, such as carriers, salts, protein, carbohydrates, and metabolites that result from the fermentation process. As shown in the Examples and discussed more below, commercially available sources of nisin do not provide the level of suppression of spoilage and pathogenic bacteria in the context of processed cheese as the cultured dairy components of the present disclosure.

In one aspect, the cultured dairy components made by the methods described herein include nisin A and/or the nisin-producing culture includes a nisin A-producing culture. Nisin A has a molecular weight of about 3,351.5 Da and the amino acid sequence of SEQ ID NO 1. However, it should be understood that other natural antimicrobials may also be utilized. For example, other forms of nisin, including Nisin Z, Nisin Q, Nisin F, and Nisin F, may be included. Other bacteriocins may also be included, such as class I bacteriocins, class II bacteriocins, class III bacteriocins, and class IV bacteriocins. Other natural antimicrobials include naturally produced antifungal agents such as, for example, natamycin (produced by *Streptomyces natalensis*) and polylysine (produced by certain *Streptomyces* species) may also be included.

Further, bacterial strains that produce natural antimicrobials may be provided. Such bacterial strains include, for example, antibacterial-producing strains of lactic acid bacteria, such as for example, nisin-producing strains of *Lactoccocus lactis* or *Brevibacterium linens*.

In one form, the cultured dairy component comprises a nisin component and/or includes a culture capable of producing a nisin component in the range of about 30 to about 90 ppm by weight of the fermentation medium.

The natural antimicrobial can be provided by culturing the antimicrobial-producing bacteria under appropriate fermentation conditions in a dairy substrate. The dairy substrate may include, for example, milk, cream, whey or other dairy-containing powder or liquid. The dairy substrate may also comprise dextrose, corn syrup or other carbohydrates supplemented with other nutrients for bacterial growth, with or without an acid neutralizer such as calcium carbonate.

In some forms, the milk may be in the form of raw milk or a concentrated milk product, such as at least about 2× concentrated milk product, in another aspect up to about 5× concentrated milk product. Typically, the milk base will container greater than about 3 percent lactose and a nitrogen source. The base can be produced from hydrated powders or derived from fresh dairy liquids, such as skim milk, two-percent milk, whole milk, and the like. By one approach, the starting dairy substrate includes concentrated milk having a total solids of about 5 to about 36, a protein content of about 1 to about 14 percent, a fat content of about 0 to about 16 percent, and a moisture content of about 64 to about 95 percent.

When the cultured dairy component is used in production of processed cheese, it has been found to be desirable to maintain a low level of moisture in the dairy substrate to reduce the increased costs associated with removing moisture from the cultured dairy component prior to inclusion in the processed cheese product. Further, certain components of the cultured dairy component may be unstable and may be degraded or otherwise damaged during a moisture removal process. For example, the EPS component of the cultured dairy component is believed to be relatively unstable and may be damaged by moisture removal techniques, such as spray drying, evaporation, and the like. However, the cultured dairy component including cultured antimicrobials may take a variety of forms such as liquid and/or powder, if desired for a particular application.

At least in some approaches, the nisin A and exopolysaccharide-producing culture used herein is *Lactococcus lactis* ss. lactis strain 329. On Aug. 21, 2013, strain 329 was deposited at the American Type Culture Collection (ATCC), 10801 University Blvd., Manassas, Va. 20110, and given accession number PTA-120552. The deposit was made under the provisions of the Budapest Treaty on the International Recognition of the Deposit of Microorganisms for the Purposes of Patent Procedure.

It has been found that *Lactococcus lactis* strain 329 has a unique genetic and phage profile compared to other nisin-producing strains of lactic acid bacteria. Advantageously, strain 329 also was found to be able to grow in concentrated dairy substrates, including about a 2× to about a 5× milk. It has been found that few cultures are capable of growing in such highly concentrated milk substrates. For example, the cultures herein are effective to grow to at least about $10^9$ CFU/gram in about 10 hours and produce more than about 2000 IU nisin A/gram in about 18 hours even in the about 2× to about 5× concentrated fermentation medium. Strain 329 was characterized using Multi Locus Sequence Typing (MLST), phage typing, and ribotyping as discussed more below.

Multi Locus Sequence Typing (MLST)

The publicly available genome of *L. lactis* subsp. lactis IL 1403 (taxid:272623), also a nisin-producing strain, was used as a template for selection of seven housekeeping genes to be used as genetic markers in a comparison of IL 1403 to strain 329. The selected genes cover a range of loci on the chromosome as detailed in Table 1 below. Each of the seven genes was amplified and sequenced. Sequences were then aligned and compared using IL1403 as the reference. Each sequence variation was accounted for and represents an individual allele.

TABLE 1

| Gene | Protein | Chromosome Location |
|---|---|---|
| acmD (SEQ ID NO 2) | n-acetylmuramidase | 527,413-528,498 |
| gapB (SEQ ID NO 3) | Glyceraldehyde 3 phosphate dehydrogenase | 2,332,466-2,333,476 |
| pdhD (SEQ ID NO 4) | Lipamidedehydrogenase component of pyruvate dehydrogenase | 58,971-60,389 |
| pepC (SEQ ID NO 5) | Aminopeptidase C | 1,947,325-1,948,635 |
| thiE (SEQ ID NO 6) | Thiamine phosphate pyrophosphorylase | 1,293,610-1,294,257 |
| yjjD (SEQ ID NO 7) | ABC transporter permease protein | 993,341-994,963 |
| yyaL (SEQ ID NO 8) | GTP binding protein | 11,119-12,234 |

Phage Typing

Spot plates were used for phage profiling of high titer phage stocks. The phages are identified and the results of the phage typing are presented in FIG. 11.

Ribotyping

Figure 12:
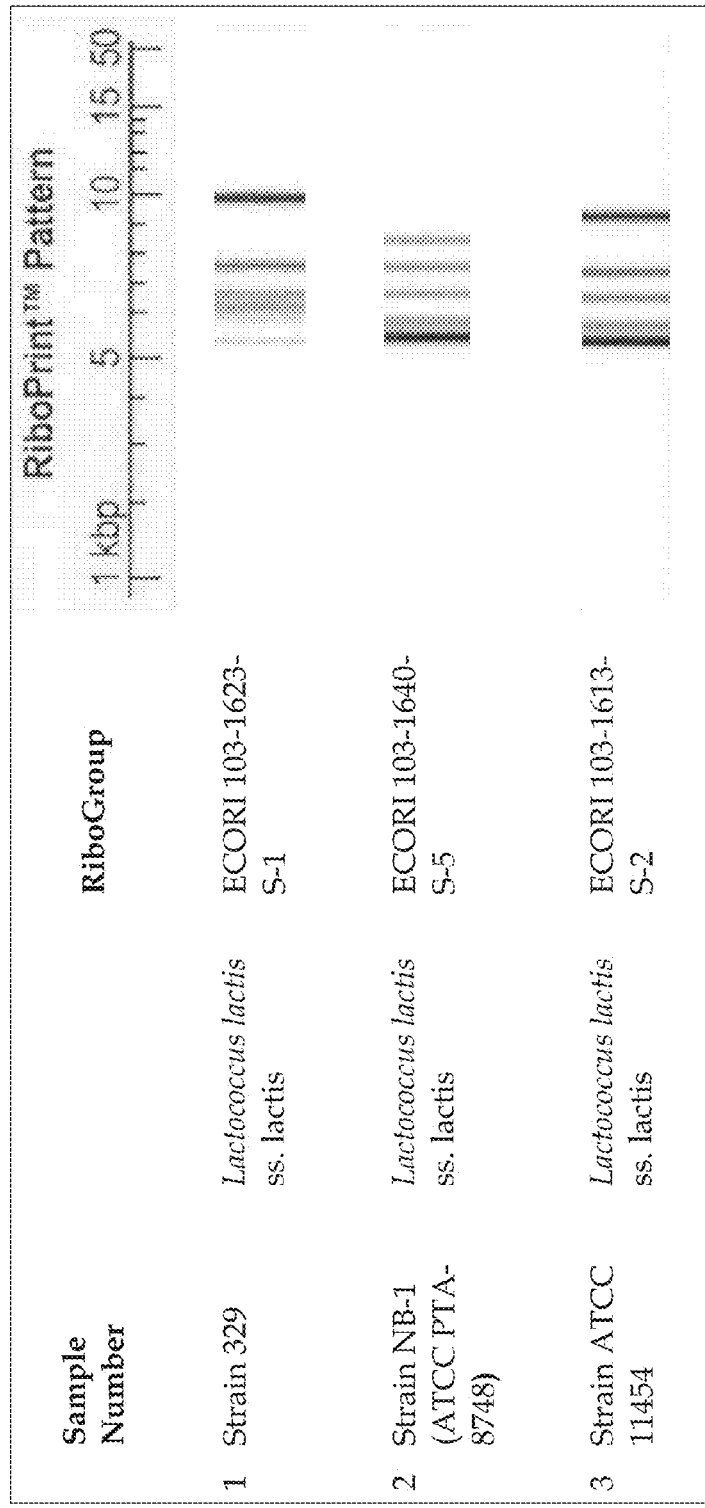
FIG. 12 includes results of Riboprinter analysis of various *Lactococcus lactis* strains.

As used herein, "ribotyping" refers to fingerprinting of genomic DNA restriction fragments containing all or part of the genes coding for the 16S and 23S rRNA. Conventional ribotyping techniques utilizing EcoRI as the restriction enzyme were carried out. The results are shown in FIG. 12. Ribotyping confirmed that *Lactococcus lactis* strain 329 is substantially different from publicly available *Lactococcus lactis* strain ATCC 11454, also a nisin-producing strain.

DNA Sequence Analysis

Figure 14:
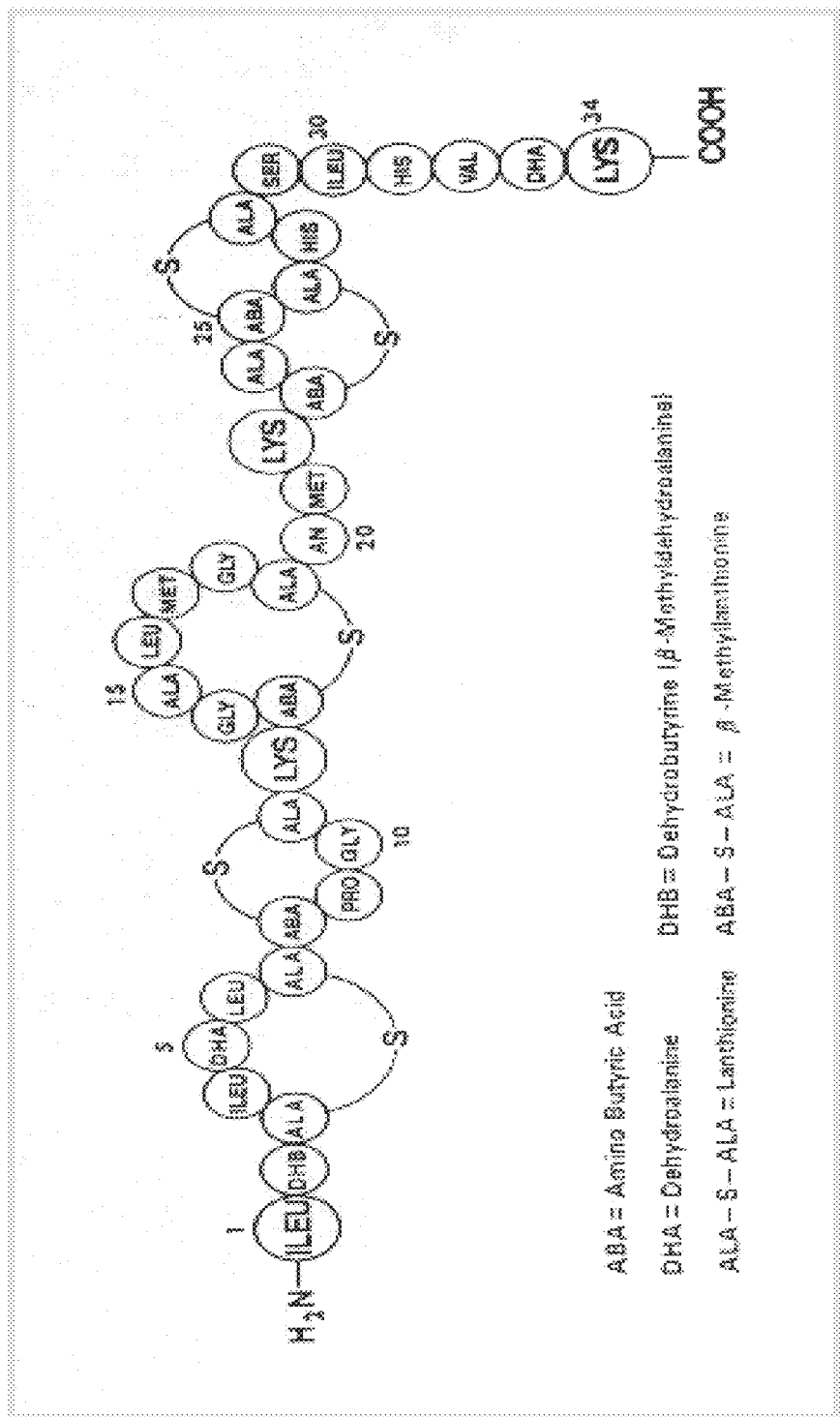
FIG. 14 shows the amino acid sequence of nisin A.

It was found that *Lactococcus lactis* strain 329 has a unique combination of exopolysaccharide and nisin cluster genes as shown in FIG. 13. *Lactococcus lactis* strain 329 includes the nisin cluster genes sequence of Table 2 below and produces nisin A having the amino acid sequence of FIG. 14 (SEQ ID NO 1).

TABLE 2

| GENE | SEQ ID Number |
| --- | --- |
| Nisin precursor nisin A | SEQ ID NO 9 |
| Nisin transport protein (nisG) | SEQ ID NO 10 |
| Nisin transport protein (nisE) | SEQ ID NO 11 |
| Nisin transport protein (nisF) | SEQ ID NO 12 |
| Nisin two-component system, response regulator (nisR) | SEQ ID NO 13 |
| Nisin sensor-receptor histidine kinase (nisK) | SEQ ID NO 14 |
| Nisin leader peptide-processing serine protease (nisP) | SEQ ID NO 15 |
| Nisin immunity protein | SEQ ID NO 16 |
| Nisin biosynthesis protein (nisC) | SEQ ID NO 17 |
| Nisin transport ATP-binding protein (nisT) | SEQ ID NO 18 |
| Nisin biosynthesis protein (nisB) | SEQ ID NO 19 |

It has been found that, at least under fermentation conditions described herein with reference to the method of FIG. 1, *Lactococcus lactis* strain 329 produces a high level of 34-mer nisin A relative to the 57-mer nisin A precursor peptide (nisin A precursor has the amino acid sequence of SEQ ID NO 20). Nisin A is produced by posttranslational modification of the nisin A precursor. At least in some approaches, *Lactococcus lactis* strain 329 produces nisin A relative to nisin A precursor at a ratio of at least about 9:1, in another aspect at least about 9.5:0.5. In contrast, Danisco's Nisaplin® includes approximately 83 percent nisin A and 17 percent nisin A precursor.

Under the same fermentation conditions effective to produce nisin A described above, *Lactococcus lactis* strain 329 also produces exopolysaccharide, such as, for example, under fermentation conditions described herein with reference to the method of FIG. 1. *Lactococcus lactis* strain 329 includes the EPS cluster genes of Table 3 below:

TABLE 3

| GENE | SEQ ID Number |
| --- | --- |
| Transcriptional regulator, XRE family | SEQ ID NO 21 |
| Esterase (EpsX) | SEQ ID NO 22 |
| Tyrosine-protein kinase transmembrane modulator (epsC) | SEQ ID NO 23 |
| Tyrosine-protein kinase | SEQ ID NO 24 |
| Undecaprenyl-phosphate galactose phosphotransferase | SEQ ID NO 25 |
| Manganese depended tyrosine-protein phosphatase | SEQ ID NO 26 |
| Polysaccharide biosynthesis protein (cpsF)/glycosyl transferase (cpsG) | SEQ ID NO 27 |
| Glycosyl transferase (cpsG)/polysaccharide biosynthesis protein (cpsM(v)) | SEQ ID NO 28 |
| Glycosyltransferase family 2 protein | SEQ ID NO 29 |
| Sugar transferase, (epsL) | SEQ ID NO 30 |
| Protein of unknown function, unknown family | SEQ ID NO 31 |
| Protein of unknown function, unknown family/Beta-1,3-glucosyltransferase | SEQ ID NO 32 |
| Polysaccharide biosynthesis protein (cpsM(v)) | SEQ ID NO 33 |

At least in some approaches, an antimicrobial-producing bacterial strain useful in the methods described herein is able to produce both nisin A of about 2000 IU/gram or more and exopolysaccharide under the fermentation conditions described in reference to FIG. 1.

The sequence information provided herein should not be so narrowly construed so as to require inclusion of erroneously identified nucleotides. The sequences disclosed herein can be used by one of ordinary skill in the art to isolate the complete gene from the bacterial strain and subject the gene to further sequence analysis to identify any sequencing errors.

As used herein, the terms "homology" and "identity" are used interchangeably. For purposes of determining the percent identity or homology of two sequences, the sequences may be aligned for optimal comparison purposes. The nucleotides or amino acids are then compared at corresponding nucleotide or amino acid positions of the two sequences. For example, a nucleotide or amino acid in a first sequence is considered identical to that of the second sequence when the same nucleotide or amino acid is located in the corresponding position in the second sequence. The percent identity is calculated by determining the number of identical positions divided by the total number of positions (i.e., overlapping positions) multiplied by 100.

Functional nucleic acid equivalents are also contemplated herein. For example, functional nucleic acid equivalents include silent mutations or other mutations that do not alter the biological function of the encoded polypeptide.

In one form, an antimicrobial-producing bacterial strain useful in the methods described herein has one or more genes of significant homology to SEQ ID NOS 9-19 and 21-33 and is able to produce nisin A and EPS under the same fermentation conditions. As defined herein, the term "significant homology" means at least 70 percent, in another aspect at least 75 percent, in another aspect at least 80 percent, in another aspect at least 85 percent identity, in another aspect at least 90 percent identity, in another aspect at least 95 percent identity, in yet another aspect at least 99 percent identity, and in yet another aspect complete identity.

In some approaches, an antimicrobial-producing bacterial strain useful in the methods described herein has at least two genes of significant homology to the sequences selected from the group consisting of SEQ ID NOS 9-19 and 21-33, in another aspect has at least three genes of significant homology to the sequences selected from the group consisting of SEQ ID NOS 9-19 and 21-33, in another aspect has at least four genes of significant homology to the sequences selected from the group consisting of SEQ ID NOS 9-19 and 21-33, in another aspect has at least five genes of significant homology to the sequences selected from the group consisting of SEQ ID NOS 9-19 and 21-33, in another aspect has at least six genes of significant homology to the sequences selected from the group consisting of SEQ ID NOS 9-19 and 21-33, in another aspect has at least seven genes of significant homology to the sequences selected from the group consisting of SEQ ID NOS 9-19 and 21-33, in another aspect has at least eight genes of significant homology to the sequences selected from the group consisting of SEQ ID NOS 9-19 and 21-33, in another aspect has at least nine genes of significant homology to the sequences selected from the group consisting of SEQ ID NOS 9-19 and 21-33, in another aspect has at least ten genes of significant homology to the sequences selected from the group consisting of SEQ ID NOS 9-19 and 21-33, in another aspect has at least eleven genes of significant homology to the sequences selected from the group consisting of SEQ ID NOS 9-19 and 21-33, in another aspect has at least twelve genes of significant homology to the sequences selected from the group consisting of SEQ ID NOS 9-19 and 21-33, in another aspect has at least thirteen genes of significant homology to the sequences selected from the group consisting of SEQ ID NOS 9-19 and 21-33, in another aspect has at least fourteen genes of significant homology to the sequences selected from the group consisting of SEQ ID NOS 9-19 and 21-33, in another aspect has at least fifteen genes of significant homology to the sequences selected from the group consisting of SEQ ID NOS 9-19 and 21-33, in another aspect has at least sixteen genes of significant homology to the sequences selected from the group consisting of SEQ ID NOS 9-19 and 21-33, in another aspect has at least seventeen genes of significant homology to the sequences selected from the group consisting of SEQ ID NOS 9-19 and 21-33, in another aspect has at least eighteen genes of significant homology to the sequences selected from the group consisting of SEQ ID NOS 9-19 and 21-33, in another aspect has at least nineteen genes of significant homology to the sequences selected from the group consisting of SEQ ID NOS 9-19 and 21-33, in another aspect has at least twenty genes of significant homology to the sequences selected from the group consisting of SEQ ID NOS 9-19 and 21-33, in another aspect has at least twenty-one genes of significant homology to the sequences selected from the group consisting of SEQ ID NOS 9-19 and 21-33, in another aspect has at least twenty-two genes of significant homology to the sequences selected from the group consisting of SEQ ID NOS 9-19 and 21-33, in another aspect has at least twenty-three genes of significant homology to the sequences selected from the group consisting of SEQ ID NOS 9-19 and 21-33, and in yet another aspect has at least twenty-four genes of significant homology to the sequences selected from the group consisting of SEQ ID NOS 9-19 and 21-33.

Turning to more of the specifics regarding methods of producing an effective cultured dairy concentrate and processed cheese and first referring to FIG. 1, a process flow diagram 10 is provided that illustrates one method of producing a cultured dairy material or cultured dairy concentrate 12 effective to produce both an antimicrobials (such as nisin A) and EPS from the same culture and under the same conditions, the product of which is effective for use with processed cheese. In this exemplary process 10, a liquid dairy starting material 14, such as a dairy liquid like whole milk may be used. In other approaches, the starting dairy liquid may be milk protein concentrate and or whey materials. The starting material 14 may have from about 5 to about 35% total solids, about 0 to about 16 percent fat, about 1 to about 14 percent protein, and about 64 to about 95 percent moisture. In another form, the starting material 14 is 3.5× concentrated whole milk having about 26 to about 30 percent total solids, about 10 to about 15 percent fat, about 8 to about 12 percent protein, and about 70 to about 70 percent moisture.

In another approach, the starting material 14 is a concentrated dairy liquid obtained from the ultrafiltration of liquid dairy milk. The concentrated starting material may be concentrated to a 2× to a 5× concentration as determined by total solids, in other approaches, about a 2× to about a 4×, and in yet other approaches, about a 3× to about a 3.5× dairy liquid. That is, a 3× concentration has 3 times the level of total solids relative to a starting dairy liquid, and a 5× concentration has about 5 times the level of total solids relative to the starting dairy liquid. In one approach, an ultra-filtration membrane may be used to achieve an appropriate concentrated starting material. One suitable membrane has a molecular weight cutoff of about 5 to about 20 KD. Other methods of concentration may also be used including microfiltration, nanofiltration, and reverse osmosis as needed for a particular application.

As discussed further below, fermentation in concentrated milks, such as the 2× to 5× milk of the present disclosure typically presents problems with prior antimicrobial cultures and fermentations. Strain 329 used within the products and methods of the present disclosure uniquely allows fermentation in a concentrated dairy liquid and, at the same time, permits formation of both nisin and EPS from the same strain and under the same fermentation conditions. By utilizing the concentrated milks for the fermentation and the ultimate production of the processed cheese ingredients herein, water content in the resultant process cheese is better controlled. The concentrated dairy components of the present disclosure combine multiple functionalities and components (i.e., such as nisin and EPS) in the same ingredient. In some approaches, this reduces the overall moisture load in the processed cheese manufacturing process and, in some cases, also simplifies the processed cheese ingredient line.

Figure 5A:
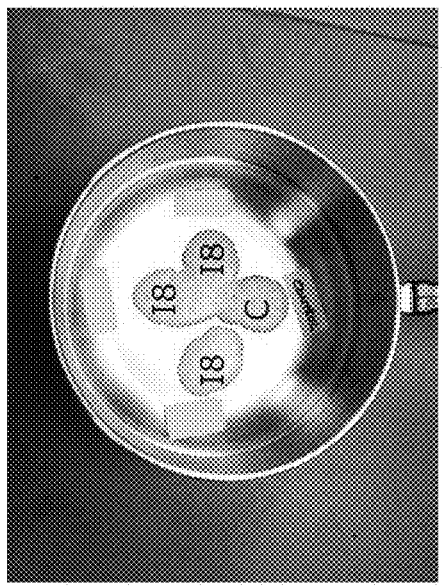
FIGS. 5A-C are photographs showing melt comparisons for various processed cheeses with and without cultured dairy components.
Figure 5B:
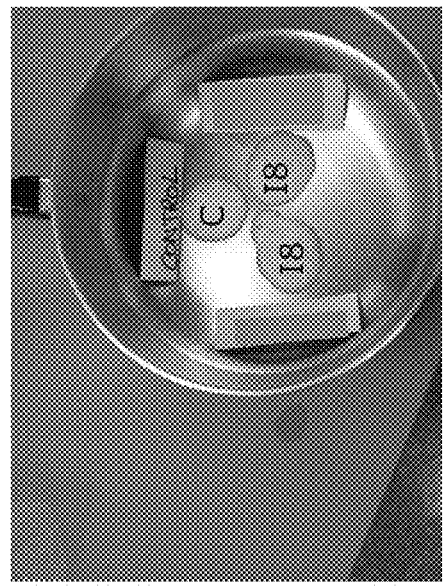

The starting material 14, which is either a liquid dairy or concentrated liquid dairy component, is then pasteurized 16 and then enters one or more fermenters 18. Pasteurization may be about 150 to about 190° F. for about 20 to about 40 seconds resulting in an exit temperature of the pasteurized starting material of about 80 to about 90° F. An antimicrobial-producing culture 20, such as *Lactoccocus lactis* strain 329, is added to the fermenter 18 along with a base solution 22 such as sodium hydroxide (e.g., a dilute 5.5N sodium hydroxide). In one form, about $2\times10^6$ to about $2\times10^8$ CFU/ml of the antimicrobial-producing culture 20 is added to the fermenter. In one embodiment, the culture 20 is a thawed form of the culture. In one approach, the fermentation temperature is maintained at about 25 to about 35° C. (in some approaches about 28 to about 32° C., and in other approaches, about 30° C.) and a pH of about 5 to about 6 (in other approaches, about 5.4 to about 5.8, and in yet other approaches, about 5.4 to about 5.6) in the fermenter. Other temperatures and pH's may also be used if the culture is able to produce nisin and EPS at desired levels under the selected conditions. For example, in one approach, the pH ranges from about 5 to about 7 and the temperature ranges from about 20 to about 40° C. The composition may be fermented over a variety of different time periods to impart different flavor characteristics to the composition. For example, in one approach, the composition is fermented for about 18 to about 22 hours. In another form, the fermentation may take place over a range of about 15 to about 48 hours. As shown in FIG. 5, by varying the fermentation time, the flavor of the cultured dairy component, and resultantly the processed cheese flavor, may be modified.

The composition is next sent to an optional shear device 24 to shear small/soft curds that may have formed. In one approach, the shear device may be a rotor/stator mixer (such as a Dispax) or other rotor shear device. This step may be optional depending on the other processing conditions as well as the properties of the materials utilized in the process. The composition is then finally subjected to an optional heat treatment step 26. In one form, the composition is heat treated 26 at about 150° F. to about 160° F. for approximately about 60 to about 100 seconds. In another form, the composition is heat treated to reduce CFU/ml to less than about 1000 CFU/ml. The resulting composition 12 is a cultured dairy component or cultured dairy concentrate that includes nisin and/or a nisin-producing material and, at the same time, EPS and/or an EPS-producing material. At least in some approaches, these two components are advantageously produced from the same starting bacterial strain, such as strain 329, and under the same fermentation conditions. The composition may be in the form of a liquid having approximately 6 to about 40% total solids. In one form, the liquid has approximately 20 to about 30% total solids, and in some approaches about 28.5% total solids.

Figure 1A:
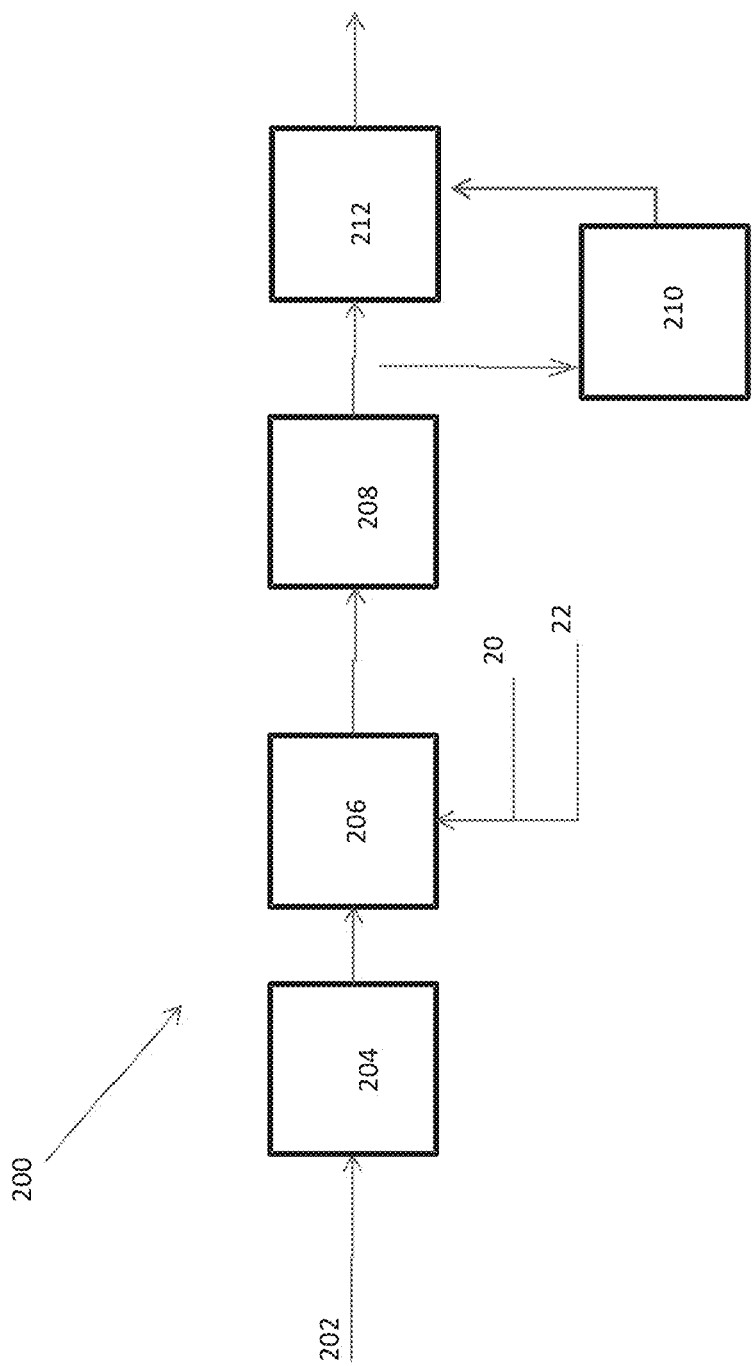
FIG. 1A is an alternative process flow diagram.

In an alternative method 200 shown in FIG. 1A, hydrated powders and/or liquid milk 202 may be first heated 204, such as in a high temperature, short time sterilization (HTST) or an ultra-high temperature (UHT) sterilization process step. Next, the heated liquid is then fermented 206 with similar materials, cultures, and conditions as described with respect to the previously discussed method. After fermentation, the material may be optionally sheared 208 and then concentrated 210. In this approach, concentration may be membrane filtration, evaporation, or centrifugation. After concentration, the resultant concentrate may be optionally heated 212 again using HTST or UHT, for example.

Figure 2:
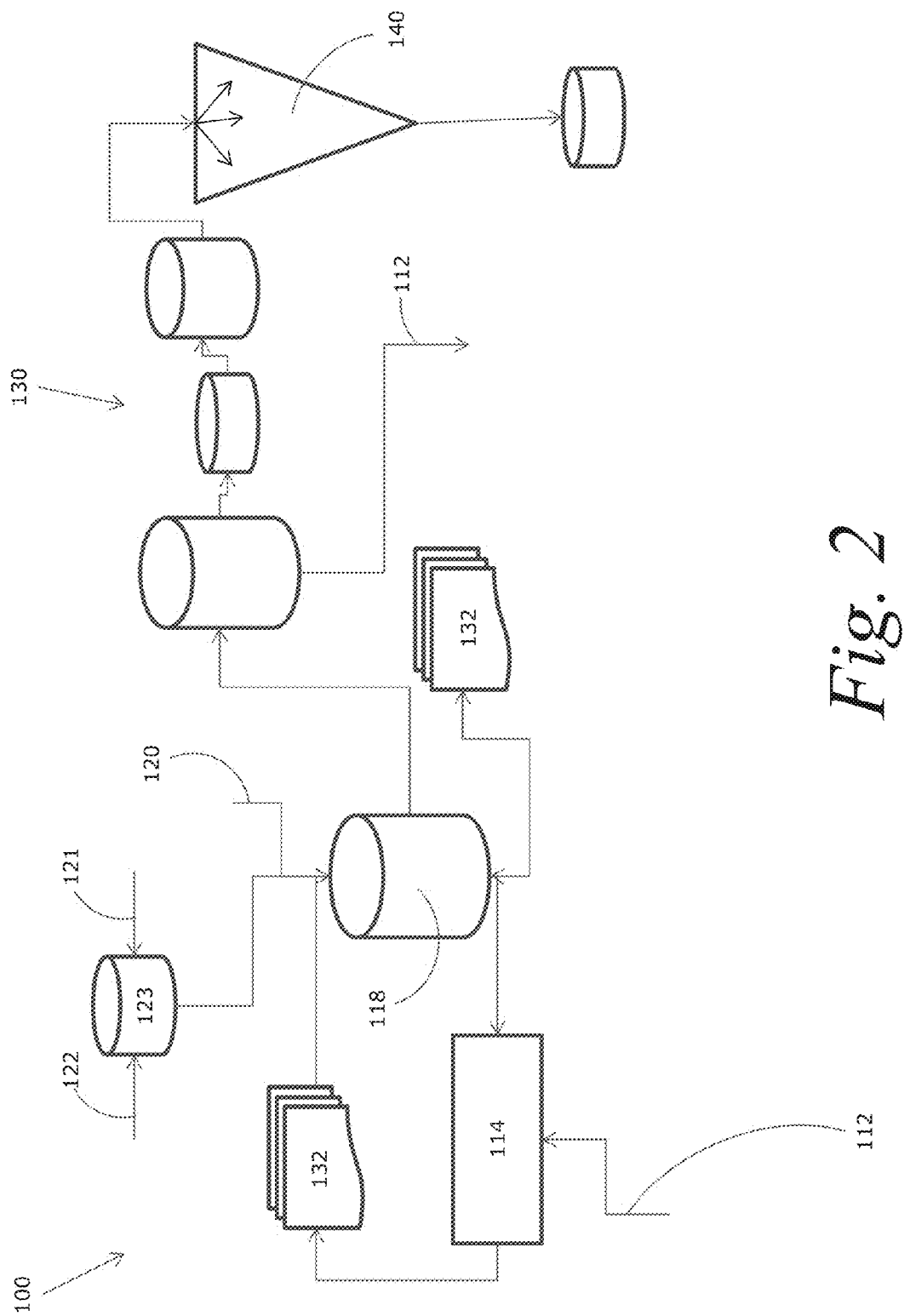
FIG. 2 is a process flow diagram illustrating a second form of production of an exemplary cultured dairy component produced from powdered dairy ingredients.

Another process 100 for preparing cultured dairy components is illustrated in FIG. 2. The process 100 in FIG. 2 utilizes powdered starting materials 112 such as powdered milk protein concentrate and powdered whey. In this approach, about 3 to about 10 percent powdered milk protein concentrate, about 2 to about 6 percent powdered whey, and about 75 to about 95 percent water are blended in a tank or a fermenter 118 to form the fermentation medium. The powders may be mixed 114 and hydrated prior to being added to the fermenter 118. These starting materials are then combined with an antimicrobial-producing culture 120, such as *Lactococcus lactis* strain 329, in an amount of about $2 \times 10^6$ CFU/ml to about $2 \times 10^8$ CFU/ml in the fermentation vessel 118 and fermented in a similar manner as described for FIG. 1. Similar to the method of FIG. 1, process water and a base, such as a dilute sodium hydroxide may also be added to the fermentation vessel 118 from tank 123. After fermentation, the composition may optionally be heated or cooled as necessary and then prepared into a final cultured dairy component 112. In some approaches, the process may include various intermediate heating and cooling 132 as needed for a particular application. In this regard, the composition 112 may be placed in one or more holding tanks 130 or other storage location for use in a concentrated liquid form. Holding tank temperatures may be about 30 to about 50° F. In one embodiment (such as in a liquid form), the cultured dairy component has from about 6 to about 11% total solids and in another form, about 20% total solids. Further, the cultured dairy component may be spray-dried, such as in an atomizer 140. In one approach, the atomizer may have a dryer temperature of about 160 to about 180° F. and about a 15 to about 25 psi pressure drop.

The cultured dairy component may take a variety of forms. For example, as shown in FIGS. 1 and 2, the cultured dairy component may be in the form of a liquid. The cultured dairy component may also take the form of a powder, such as from spray drying as shown in FIG. 2. Furthermore, the cultured dairy component may also be in a concentrated form, such as components obtained by evaporation, filtering and the like. The resulting product of the method from FIG. 1 or 2 may be either a liquid or spray dried depending on the particular application. FIG. 2 provides exemplary steps for spray drying and it will be appreciated that these steps can also be used with the methods of FIG. 1. It will be appreciated that if the cultured dairy component is further processed by concentration, spray drying or the like, this further processing will be completed in a manner to not substantially affect the raisin and/or EPS.

The cultured dairy component produced by the methods of FIGS. 1 and 2 with both antimicrobials and EPS produced from the same bacterial strain may then be used in and/or to manufacture processed cheese. In one approach, the processed cheese may be produced by blending together natural cheese or mixture of natural cheeses, moisture, and a an optional additional dairy protein source (such as milk protein concentrate, whey, whey protein concentrate, ultrafiltered milk, and the like) and the cultured dairy component. Sodium chloride may be added for flavor. Other optional ingredients may be added to improve texture, flavor, nutrition, and/or cost attributes. These include, but are not limited to, whey derived ingredients (e.g., whey protein concentrate), non-fat dry milk, milk protein concentrate, anhydrous milk fat, gums, starches, gelatin, and the like. The ingredients are blended together and then heated to pasteurization temperatures. Optionally, shear may be applied during or after the heating.

Whey protein refers to a collection of globular proteins that can be isolated from whey, which is the liquid remaining after milk has been curdled and strained. Whey protein is typically a mixture of beta-lactoglobulin, alpha-lactalbumin, and serum albumin proteins. In one embodiment, whey protein concentrate (WPC) may be used as the whey protein source. WPC is derived from whey by conventional concentration techniques. The whey protein source may also include lactose, vitamins, minerals, and fat.

Moisture may be added to the blend by any method, such as, but not limited to, injecting steam into the cooker (e.g., a laydown cooker), comingling of condensed steam from cooking, and/or direct addition of water. Of course, moisture can also enter into the system through the various ingredients (e.g., moisture from the natural cheese). Overall moisture of the final cheese products includes all moisture independent of how the moisture was introduced into the final product. Advantageously, because the cultured dairy components of the present disclosure, in some forms, are concentrated dairy components that include both nisin and EPS at the same time, water management of the processed cheese is improved. To this end, because nisin and other texture modifying ingredients do not need to be separately added, less water tends to be added into the processed cheese via the cultured dairy component ingredient.

As is known by one of ordinary skill in the art, the ingredients may be used in varying amounts in the processed cheese depending on the desired outcome of the cheese product. For example, for a reduced sodium cheese product, a cheesemaker may include a small amount or no salt in the cheese blend. The processed cheese may also include a range of amounts of the cultured dairy components, depending on the form and composition of the cultured dairy components and the desired form of the processed cheese.

For example and in one form, the processed cheese may include about 10 to about 90% natural cheese. According to another form, the processed cheese may include about 30 to about 60% natural cheese. In yet another form, the processed cheeses herein may include about 35 to about 55% natural cheese. As used herein, natural cheese generally means cheese provided from unpasteurized cheese obtained from curdled milk and one of rennet, rennet substitutes, acidification, and combinations thereof.

The processed cheese may also include a number of other dairy ingredients from various sources as needed for a particular application. For example and in one form, the processed cheese may include milk protein concentrate from about 0 to about 50% (in other approaches, about 10 to about 25%), whey protein concentrate from about 0 to about 25% (in other approaches, about 1 to about 10%), whey from about 0 to about 30% (in other approaches, about 1 to about 10%), milkfat/cream from about 0 to about 30% (in other approaches, about 1 to about 15%) and the like. The processed cheese may also include emulsifiers, such as sodium citrate, disodium phosphate and the like in an amount of about 0% to about 5% (in other approaches, about 1 to about 3%). The processed cheese may also include salt, flavorings, fortifications, colorants and the like to provide the desired color, flavor, etc. The processed cheese may also include added water and/or moisture from the ingredients to provide the desired finished product moisture. For example, vitamins and other minerals may also be added as needed to fortify the processed cheese, by one approach, from about 0 to about 3 percent of vitamin A, vitamin D and/or calcium powders (such as tricalcium phosphate). In other applications, salt may also be added as needed. In some approaches, about 0 to about 5 percent salt may be added.

Furthermore, instead of traditional preservatives, the processed cheese may include the cultured dairy component of the present disclosure and made via the methods described herein. In one form, the processed cheese may include about 1 to about 20% cultured dairy component. In another form, the processed cheese includes about 4 to about 10% cultured dairy component. In some approaches, the cultured dairy components of the present disclosure provide a much higher total antimicrobial activity as nisin equivalent relative to the nisin content (a nisin activity ratio). For instance and in some approaches, the cultured dairy components and processed cheese utilizing the amounts of cultured dairy components described herein exhibit a nisin activity ratio of about 0.3 or less.

It should be noted that the cultured dairy components may be used as a replacement for artificial preservatives and/or may also be used to partially supplement or replace other components in the overall processed cheese composition. For example, depending on the form of the cultured dairy component, the amount of the cultured dairy component may be used to supplement or otherwise replace a portion of the other dairy materials in the composition, such as the milk fat, casein, whey and the like. In other words, the ratio of the other dairy materials may be modified as a result of the use of the cultured dairy components. When the processed cheeses include the cultured dairy components herein, the cheese may be substantially free of traditional preservatives, such as sorbic acid, nitrites and the like. By one approach, substantially free of generally means less than about 0.5 percent, in other approaches, less than about 0.1 percent, and in other approaches, not present at all.

In one form, the processed cheese includes about 40% natural cheese, 35% other dairy materials, about 8% cultured dairy components, about 12% water and the remainder salts, flavoring, colors, vitamins, minerals and the like. The processed cheese may be manufactured as generally understood with the addition of the cultured dairy components during cooking, and alternatively, during cheese blending steps. In one form, the cheese product described herein may be any of a cheese dip, a cheese spread, a cheese block, a cheese slice, a shredded cheese, or the like. In some approaches, the various forms of processed cheese of the present disclosure may include about 10 to about 90% natural cheese, about 0 to about 50% milk protein concentrate, about 0 to about 30% milk fat or cream, about 40 to about 60% water, about 1 to about 20% cultured dairy component, about 0 to about 30% whey, and about 0 to about 25% whey protein concentrate in combination with various optional flavors, salts, and emulsifiers described above.

In another form, the processed cheese includes about 10 to about 30% total fat (in other approaches, about 20 to about 30% fat), about 8 to about 25% total protein (in other approaches, about 15 to about 25% total protein), and about 40 to about 60% total moisture (in other approaches, about 40 to about 50% moisture).

Not only does the processed cheese made with the cultured dairy components of the present disclosure exhibit unexpected benefits of texture because it achieves an improved melt profile and increased firmness at the same time, the processed cheese made with the cultured dairy components of the present disclosure also exhibits improved antimicrobial characteristics in the context of a high protein and high fat product, such as a processed cheese with about 10 to about 30% fat and about 8 to about 25% protein. While prior commercial forms of nisin were commonly understood to inhibit *C. botulinum* in liquid media or broth, when such prior forms of nisin were used in a high-protein and high-fat food systems, such as processed cheese, the nisin was less effective at inhibiting the *C. botulinum* and other pathogens. While not wishing to be limited by theory, it is believed that the high protein, high fat, and in some case, the lower moisture level of the processed cheeses described herein, tend to protect and/or encapsulate the *C. botulinum* and other pathogens rendering traditional nisin and traditional natural antimicrobials less effective. It was unexpectedly discovered that the nisin obtained from the antimicrobial cultures herein, and in particular, strain 329, are effective to inhibit *C. botulinum* and other food-borne pathogens such as *Listeria monocytogenes*, in the context of high fat and high protein processed cheese much better than other forms of nisin as generally shown below in Example 1. In some approaches, the cultured dairy component in processed cheese provides an amount of nisin effective to prevent toxin formation from at least *C. botulinum* as determined by conventional toxin bioassay with mice in the processed cheese at the high protein and the high fat levels described herein for at least about 9 to about 10 days at about 86° F. In one approach, the biotoxin assay may be performed in accordance with Haim M. Solomon et al., Bacteriological Analytical Manual, Chapter 17, *Clostridium botulinum*, January 2001, available at http://www.fda.gov/Food/FoodScienceResearch/LaboratoryMethods/ucm070879.htm, which is hereby incorporated by reference in its entirety.

Not only do the cultured dairy components of the present disclosure inhibit *C. botulinum* and other pathogens in the context of a high protein and high fat processed cheese, the cultured dairy components achieve such inhibitory effects at lower activity levels and/or lower dosage levels than previously found possible.

In other approaches, liquid forms of the cultured dairy components herein or made by the processes herein retain higher levels of nisin activity in the final processed cheese, which was not achievable using prior commercial forms of nisin when used in processed cheeses. By one approach, the cultured dairy ingredients described herein and made by the methods described herein are effective to retain about 50 to about 90 percent activity, and in other approaches, about 60 to about 75 percent activity as compared to the activity of the ingredient prior to incorporation into the processed cheese.

In some approaches, the cultured dairy component is made using an ultrafiltered dairy liquid either before or after fermentation. In these approaches, the cultured dairy component has reduced levels of lactose and other dairy minerals. For example and in some approaches, the cultured dairy component and the processed cheese utilizing the cultured dairy component may have less than about 0.1 percent lactose and less than about 15 percent lactate as acid. In other approaches, the cultured dairy component and the processed cheese utilizing the cultured dairy component may also have less than about 600 mg/100 grams of calcium.

Advantages and embodiments of the compositions, methods, and compositions produces by the methods described herein are further illustrated by the following examples; however, the particular conditions, processing schemes, materials, and amounts thereof recited in these examples, as well as other conditions and details, should not be construed to unduly limit this method. All percentages and ratios within this disclosure are by weight unless otherwise indicated.

EXAMPLES

The following examples illustrate the performance of processed cheese slices prepared with cultured dairy components as described above and control samples of process cheese without the cultured dairy component but, instead, using sorbic acid as the preservative. The samples were generally prepared as processed cheese slices having about 46 percent moisture, about 23 percent fat, about 1.2 percent salt, and about 18 percent protein with varying amounts of preservatives and/or cultured dairy components (where indicated), flavors, colors, vitamins, minerals and the like.

Example 1

Processed cheese slices were prepared utilizing liquid cultured dairy component with 28% solids as described herein from strain 329 and compared to processed cheese slices prepared with cultured spray-dried whey. The cultured spray-dried whey was in a powdered form having approximately 96% solids with essentially no fat and little protein. Both the commercial, cultured spray-dried whey and the liquid cultured dairy component made according to the process of FIG. 1 and utilizing strain 329 were used in a processed cheese. Table 4 below illustrates that the processed cheese prepared with cultured dairy components from strain 329 retained significantly more antimicrobial activity when compared to commercially available antimicrobial materials. This activity retention effect was seen for both the 6% and 8% loading of the cultured dairy components in processed cheese. In this regard, as the cultured dairy components retain antimicrobial activity much better than the commercially available microbial, the antimicrobial effect may last longer and otherwise require lower dosing for the same efficacy.

TABLE 4

Activity retention of antimicrobials in processed cheese

| Antimicrobial | Ingredient Activity AU/g | % Usage in Processed Cheese | Dosage Level AU/g | Activity Level in processed cheese slice, AU/g | % Retention |
|---|---|---|---|---|---|
| Comparative, spray dried cultured whey | 20,000 | 1% | 200 | 90 | 45% |
| Comparative, spray dried cultured whey | 20,000 | 2% | 400 | 130 | 32.5% |
| Liquid, cultured dairy component of the present disclosure | 2220 | 6% | 133.2 | 90 | 67.6% |
| Liquid, cultured dairy component of the present disclosure | 2220 | 8% | 177.6 | 150 | 84.5 |

Another comparison was made where a liquid cultured dairy component prepared from powders and combined with liquid water according to the method of FIG. 2 having about 20% total solids were prepared. In this comparison, a commercially available nisin source (Nisaplin, Danisco) and a spray dried cultured whey powder were each included in processed cheese and compared to a similar processed cheese made with the cultured dairy component of the present disclosure. As shown in Table 5 below, when 8% of the cultured dairy component made from strain 329 in accordance with the present disclosure was used in processed cheese slices, no toxin (*C. botulinum*) was detected after about 10 days whereas similar processed cheese prepared with commercially available antimicrobials (either Nisaplin or spray dried cultured whey) had toxins present on about days 7 and 10. The toxin challenge study was performed by Silliker Laboratory. Other conventional methodologies for toxin challenge studies may also be used, if desired.

TABLE 5

*C. botulinum* Challenge Study

| Antimicrobial | % Usage in Processed Cheese | Measured AU in Finished Product | Key Results of CBOT Challenge Study |
|---|---|---|---|
| Comparative, Commercially available nisin (Nisaplin) | 0.023% | 210 AU | Toxin present at day 10 |
| Comparative, Spray dried cultured whey | 1% | 90 AU | Toxin positive on day 7@ 86° F. |
| Cultured dairy component of present disclosure (20% total solids, liquid) | 8% | 70 AU | No toxin present at day 10 |

Example 2

Figure 3:
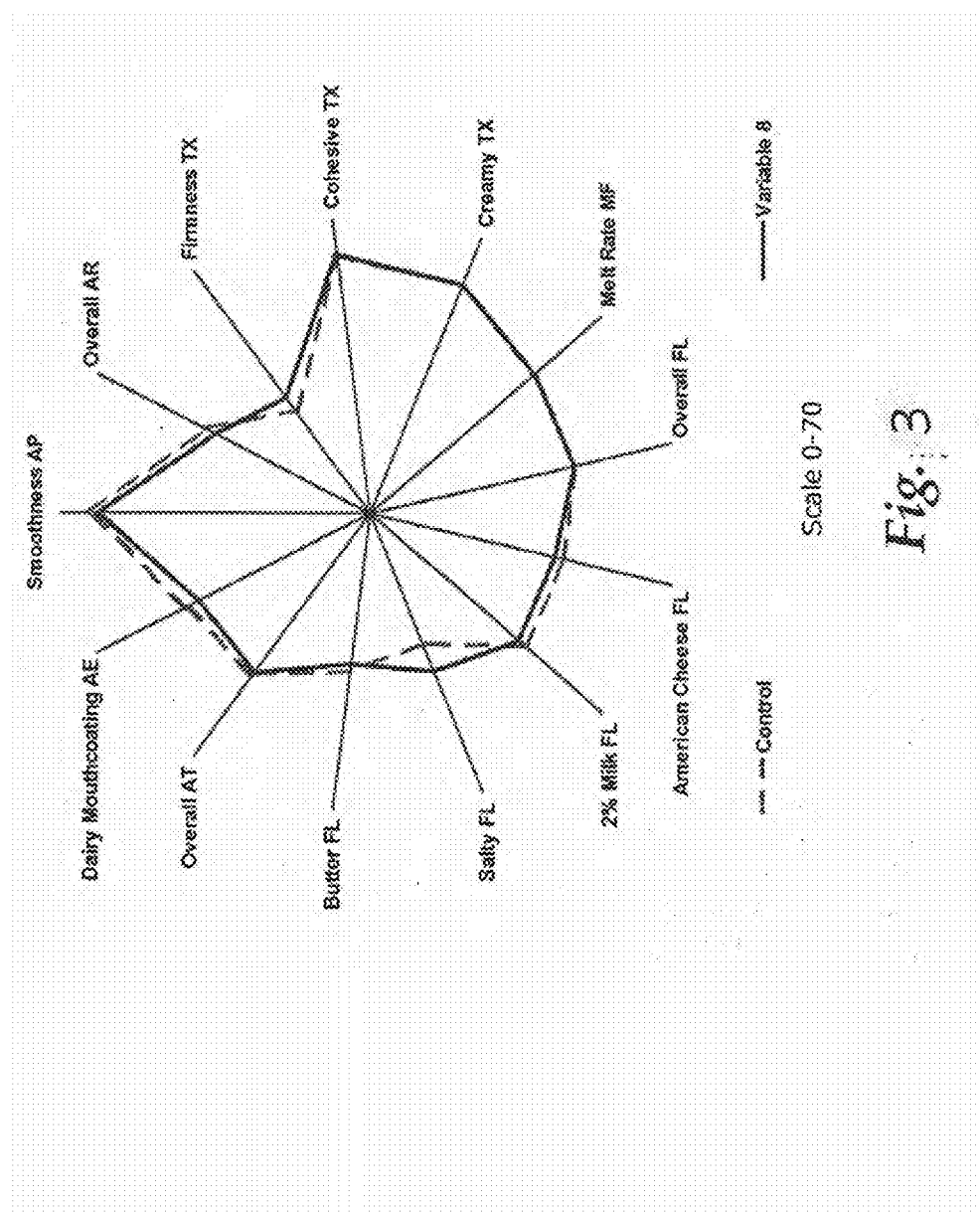
FIG. 3 illustrates taste profiles for processed cheese with and without cultured dairy components.
Figure 4B:
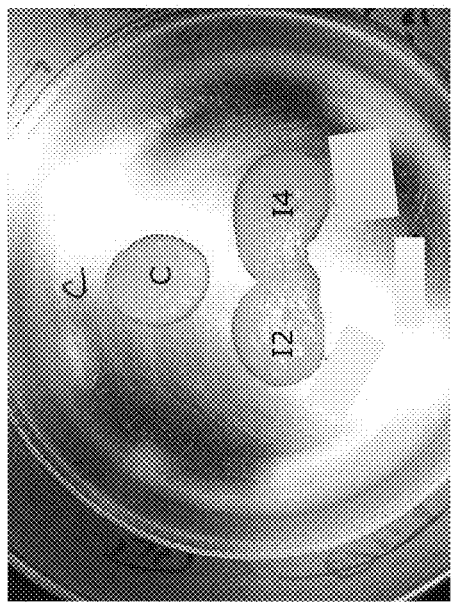
FIGS. 4A-D are photographs showing melt comparisons for various processed cheeses with and without cultured dairy components.
Figure 4D:
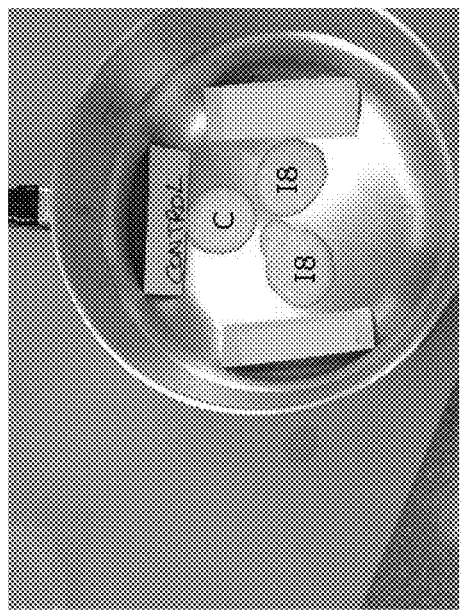
Figure 4A:
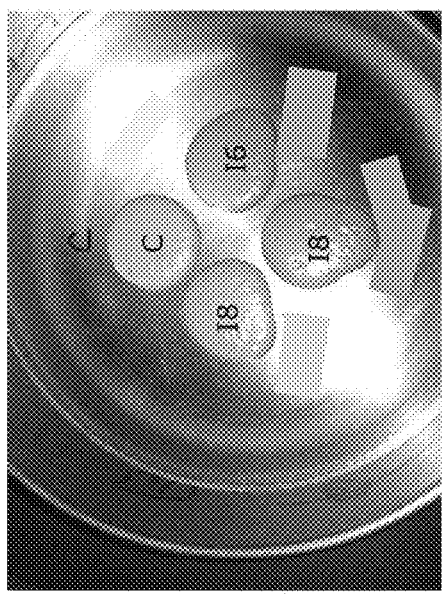
Figure 4C:
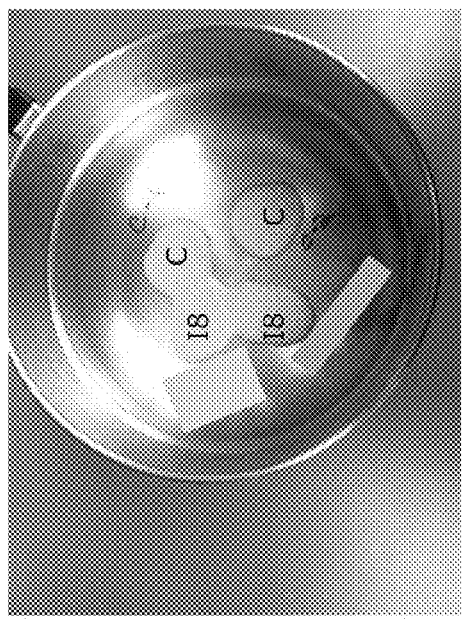
Figure 8:
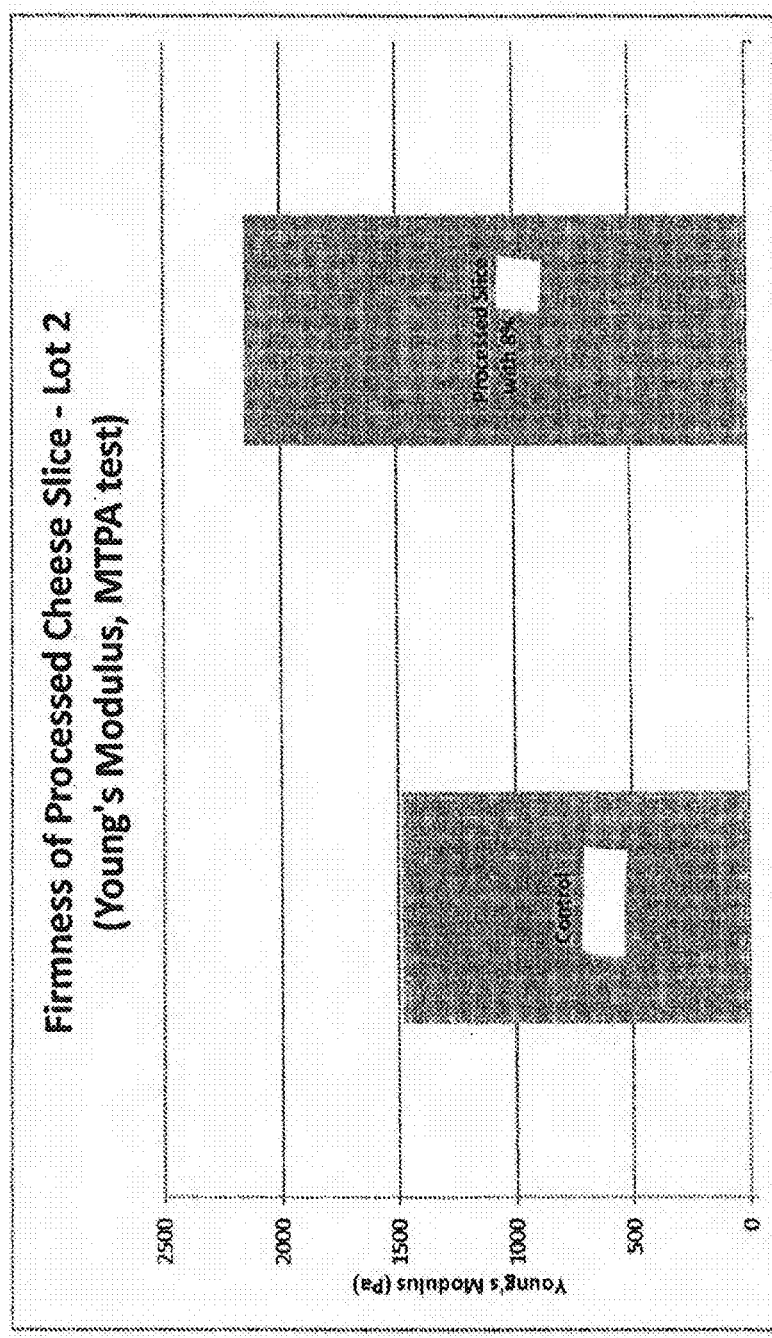
FIG. 8 is a graph showing the firmness measurements for processed cheese with 8 percent cultured dairy components compared to a control without cultured dairy components.

Flavor comparisons were performed on samples of processed cheese slices as shown in FIG. 3. Processed cheese samples were prepared with about 0.2 percent sorbic acid as a preservative (identified as "control") or without sorbic acid and about 8% cultured dairy component prepared according to the present disclosure and utilizing strain 329 (identified as "variable 8") and tasted and evaluated by a trained sensory panel. As shown in FIG. 8 (which summarizes the taste perception in the mouth of the trained panel), processed cheese prepared with the cultured dairy components of the present disclosure generally had the same taste perception profile as processed cheese prepared with sorbic acid as a preservative. Therefore, it is expected that it would be acceptable, from a flavor perception aspect, to replace sorbic acid as a preservative with cultured dairy components.

Example 3

Numerous processed cheese samples were prepared to compare the melt profiles of processed cheese slices prepared with and without the cultured dairy components obtained from strain 329 of the present application. The samples include about 2% to about 8% cultured dairy components and were compared to control samples without the cultured dairy components. The fat, moisture, protein, and pH of the cheese was held relatively constant between all the test samples (about 43 to about 44 percent moisture and about 5.7 pH). The control samples without the cultured dairy component contained 0.18% sorbic acid as a preservative or, in some cases, were free of sorbic acid in order to rule out that the melt was due to the lack of sorbic acid. In this Example, the samples made with the cultured dairy component increased in melt diameter. The others did not. This is shown by the date in tables 6, 7, and 8 below.

Figure 5C:
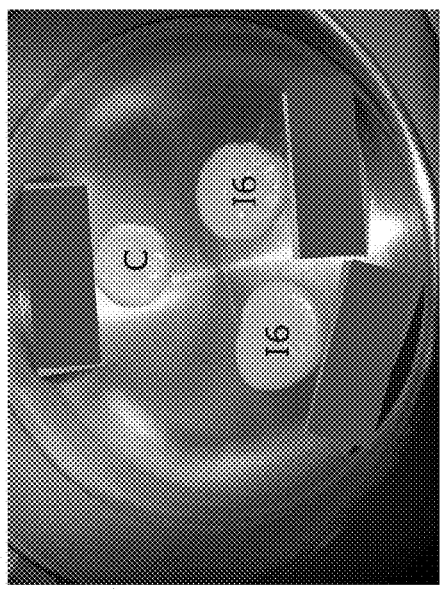

Each test sample included 3 circular slices of processed cheese stacked on top of one another. The samples were placed on top of a double boiler and heated with boiling water on medium heat for approximately 4 minutes. As shown in FIGS. 4A-D and 5A-C, the samples prepared with cultured dairy components had increased surface area when melted as compared to the control samples without the cultured dairy components of the present application. As shown in FIG. 5C, the melt diameter of the control cheese was about 1.125 inches while the melt diameter of the inventive samples with about 6 percent of the cultured dairy component were about 1.6 and about 1.45 inches. In these figures, controls samples are labeled "C" and inventive samples are labeled I2, I4, I6, or I8 representing inventive processed cheese disks with either about 2 percent, 4 percent, 6 percent or 8 percent cultured dairy component made with strain 329.

Surface area measurements were completed to measure the melt profiles of the samples. Tables 6, 7, and 8 to below illustrate calculated surface areas using ImageJ software (a public domain, Java-based image processing program, National Institute of Health) for some of the samples corresponding to those shown in FIGS. 4A-D and 5A-C. As shown in the tables, processed cheese samples prepared with the cultured dairy components of the present application at 4%, 6% and 8% in processed cheese all showed increased surface area upon melting compared to the controls without cultured dairy components. Generally, consumers prefer processed cheese with increased melt performance such as shown by the samples with cultured dairy components.

TABLE 6

Surface Area Measurements

| Sample | Surface Area (square pixels) | Surface Area (square pixels) |
|---|---|---|
| Control Lot | 89088 | 189300 |
| 8% cultured dairy component | 139149 | 326995 |
| % Area Increase w/cultured dairy component | 56.19% | 72.74% |

TABLE 7

Surface Area Measurement

| Sample | Surface Area (square pixels) | % Area Increase with Cultured Dairy Component |
|---|---|---|
| Control Lot | 167488 | n/a |
| 4% liquid cultured dairy component | 211365 | 26.20% |
| 4% cultured dairy component powder | 223930 | 33.70% |

Based on the data above, the samples including the cultured dairy component of the present disclosure resulted in wider disc melts than the control samples without the cultured dairy component.

TABLE 8

Surface Area Measurement

| Sample | Surface Area (square pixels) | % Area Increase with Cultured Dairy Component |
|---|---|---|
| Control Lot | 179171 | n/a |
| 6% liquid cultured dairy component | 233075 | 30.09% |
| 6% cultured dairy component powder | 248472 | 36.68% |

Example 4

FIGS. 6-9 illustrate firmness and consistency comparisons between processed cheese slices made with cultured dairy components made by the methods of the present application using strain 329 and without cultured dairy components (control). In this Example, the solids, protein, fat, and moisture were held relatively constant across all samples tested. The samples without the cultured dairy component included 0.18 sorbic acid as a preservative and, in some cases, did not contain sorbic acid or any preservatives so as to rule out the firmness was due to the lack of sorbic acid. In this Example, only the samples with the cultured dairy component increased in firmness and consistency.

Figure 6:
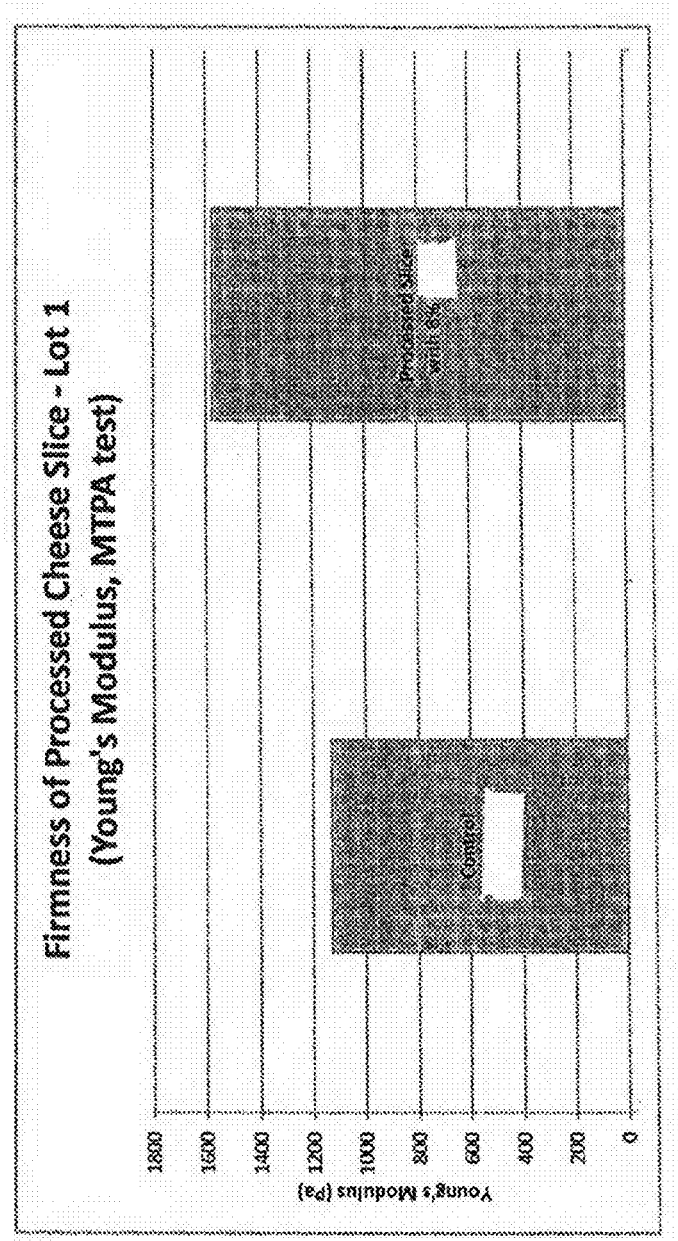
FIG. 6 is a graph showing the firmness measurements for processed cheese with 8 percent cultured dairy components compared to a control without cultured dairy components.

As shown in FIGS. 6 and 8, the processed cheese with cultured dairy components showed increased firmness (i.e., Young's modulus) compared to the control samples made without cultured dairy components. Generally, this increased firmness suggests a more natural cheese composition to consumers. Young's modulus, which is also known as the tensile modulus, is a measure of the stiffness of a material. In the context of a processed cheese, Young's modulus is a measurement of the initial touch of the cheese slice. In the context of this Example, initial touch means the resistance that the cheese provides when it is touched with a finger or hand. It is another measurement of the perception of firmness. Young's Modulus was measured using a texture profile analysis (MTPA) using a texture analysis machine (Texture Technologies Corp) that measures the amount of force needed to penetrate a stack of cheese slices when a known weight is applied. For this test, about ten 21 gram slices of cheese are stacked together. Generally, Young's modulus is calculated by dividing the tensile stress by the tensile strain in the material and represents the ratio of stress (load) to the strain (deformation) in the initial Hookean region. This typically represents how stiff or firm a sample is in response to an external load. Further, a product having a higher consistency value should provide a more chewy sensory perception.

Figure 7:
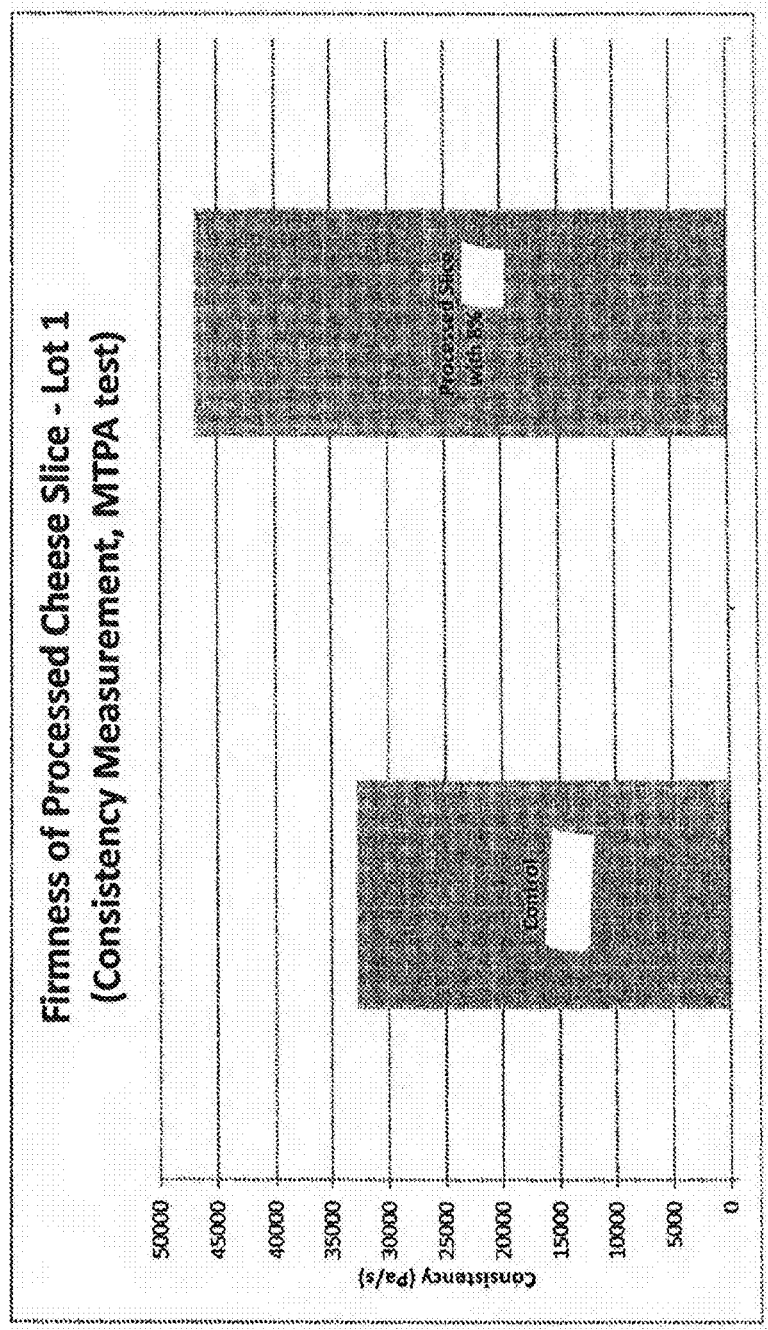
FIG. 7 is a graph showing the consistency measurements for processed cheese with 8 percent cultured dairy components compared to a control without cultured dairy components.
Figure 9:
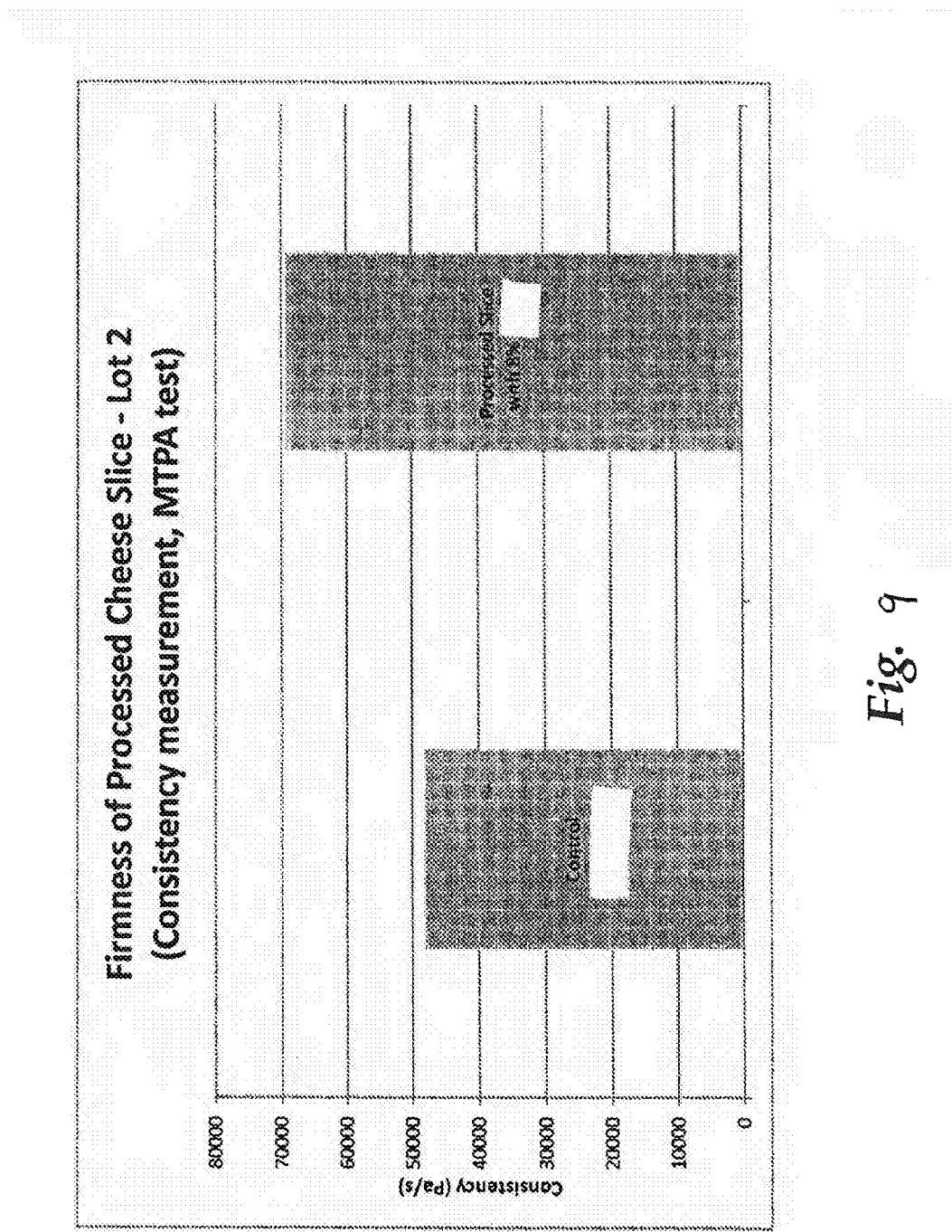
FIG. 9 is a graph showing the consistency measurements for processed cheese with 8 percent cultured dairy components compared to a control without cultured dairy components.

Further, FIGS. 7 and 9 illustrate the consistency of the processed cheese samples via the firmness during flow of the cheese while the force is being applied during the MPTA test. As shown in FIGS. 7 and 9, the processed cheese with cultured dairy components showed increased consistency during flow compared to the samples without cultured dairy components. Generally, this increased firmness during flow also suggests a more natural cheese composition to consumers. As used herein, consistency is generally related to the firmness during flow or resistance to flow. In the context of processed cheese, the higher the consistency value, then the cheese exhibits a slower rate of breakdown in the mouth, which is generally perceived as a desirable characteristic to consumers.

As shown above, processed cheese compositions prepared with cultured dairy components of the present disclosure and made from strain 329 are capable of providing at least equivalent, if not improved, antibacterial properties and preservative functionality. Further, it has been unexpectedly found that processed cheese prepared with these cultured dairy components exhibit improved melt and, at the same time, increased firmness of the processed cheese. Generally, it was previously expected that when cheese melt increases, the firmness decreases. It is believed that the materials generated in the cultured dairy component by strain 329 unexpectedly help to improve both properties of the cheese at the same time.

Example 5

Figure 15A:
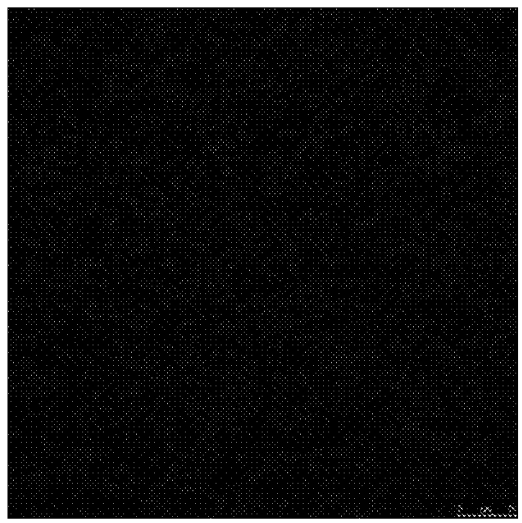
FIG. 15(A) is a scanning confocal microscopy images showing the absence of EPS prior to inoculation and fermentation with *L. lactis* strain 329
Figure 15B:
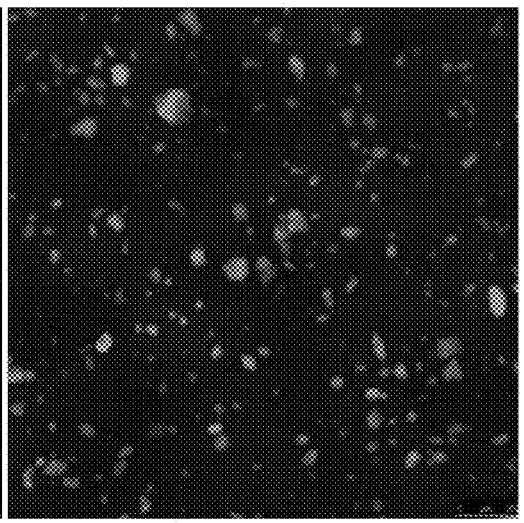
FIG. 15(B) is a scanning confocal microscopy images showing the presence of EPS after fermentation with *L. lactis* strain 329.

3× milk (pH 5.46) was used as the liquid media for fermentation of cultured dairy components. A sample of the 3× milk was taken prior to inoculation with *L. lactis* strain 329. The cultured dairy components were prepared according to the process of FIG. 1 with an approximately 21 hour fermentation. A further sample was taken after fermentation (pH 5.46). The samples were then stained using Alexa Fluor® 488 conjugate of Concavalin A, which selectively binds to α-mannopyranosyl and α-glucopyranosyl residues, to determine if exopolysaccharides were produced during fermentation. The ConA Alexa Fluor 488 was solubilized in 0.1 M phosphate buffer at pH 6.8 and diluted with whey permeate to pH 6. Drops of staining solution were applied to the samples onto a chambered glass slide and left for 30 minutes at 25° C. The slides were then covered with a glass coverslip and observed with a Leica SP5 confocal scanning laser microscope (CSLM) with a 20× objective with 495 nm (excitation) and 519 nm (emission) wavelengths. As shown in FIGS. 15A and 15B (scale bar 25 μm), exopolysaccharide (EPS) was observed in the fermented sample but not in the 3× milk starting material prior to inoculation with strain 329. EPS was observed as a large aggregated mass.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method of producing a processed cheese having natural antimicrobials, the method comprising:
   fermenting a liquid dairy medium with a lactic acid-producing *Lactococcus lactis* strain to produce a cultured dairy component including nisin and exopolysaccharide;
   adding the cultured dairy component to a natural cheese or mixture of natural cheeses with one or more emulsifiers to produce a processed cheese having about 8 to about 25 percent protein and about 10 to about 20 percent fat;
   wherein the processed cheese includes an amount of nisin, effective to prevent toxin formation from *C. botulinum* determined by toxin bioassay with mice, in the processed cheese at the protein and the fat levels thereof for about 9 days at 86° F.; and
   wherein the processed cheese includes an amount of exopolysaccharide effective to increase the melt of the processed cheese and increase the firmness of the processed cheese relative to a processed cheese without nisin and exopolysaccharide, and
   the nisin and the exopolysaccharide in the cultured dairy component are obtained from the fermentation of the same *Lactococcus lactis* strain in the liquid dairy medium.

2. The method of claim 1, wherein the cultured dairy component includes about 1 to about 100 ppm of nisin and about 100 to about 2000 ppm of the exopolysaccharide.

3. The method of claim 1, wherein the processed cheese includes about 1 to about 20 percent of the cultured dairy component.

4. A method of producing a processed cheese having natural antimicrobials, the method comprising:
   fermenting a liquid dairy medium with a lactic acid-producing *Lactococcus lactis* strain to produce a cultured dairy component including nisin and exopolysaccharide, wherein the nisin and exopolysaccharide are both produced from the *Lactococcus lactis* strain under the same fermentation conditions;
   adding the cultured dairy component to a natural cheese or mixture of natural cheeses with one or more emulsifiers to produce a processed cheese having about 8 to about 25 percent protein and about 10 to about 20 percent fat;
   wherein the processed cheese includes an amount of nisin, effective to prevent toxin formation from *C. botulinum* determined by toxin bioassay with mice, in the processed cheese at the protein and the fat levels thereof for about 9 days at 86° F.; and
   wherein the processed cheese includes an amount of exopolysaccharide effective to increase the melt of the processed cheese and increase the firmness of the processed cheese relative to a processed cheese without nisin and exopolysaccharide, and
   the *Lactococcus lactis* strain is an isolated *Lactococcus lactis* strain having all of the identifying characteristics of the *Lactococcus lactis* strain ATCC PTA-120552.

5. The method of claim 4, wherein the *Lactococcus lactis* strain is *Lactococcus lactis* strain ATCC PTA-120552 and fermentation of the *Lactococcus lactis* strain ATCC PTA-120552 is conducted in a 2X to a 5X concentrated liquid dairy medium at a temperature of about 25 to about 35° C. and a pH of about 5 to about 6 for about 15 to about 48 hours.

6. The method of claim 5, wherein the concentrated liquid dairy medium is a concentrated milk having a total solids of about 5 to about 36 percent, about 1 to about 14 percent protein, and about 0 to about 16 percent fat.

7. The method of claim 1, wherein the processed cheese is free of artificial preservatives selected from the group consisting of sorbic acid, potassium sorbate, nitrites, and mixtures thereof.

8. The method of claim 1, wherein the nisin is nisin A.

9. The method of claim 1, wherein the cultured dairy component includes nisin A and the *Lactococcus lactis* strain includes at least one gene from a nisin producing gene cluster comprising a sequence selected from the group consisting of SEQ ID NOS 9 to 19 and at least one gene from an exopolysaccharide producing gene cluster comprising a sequence selected from the group consisting of SEQ ID NOS 21 to 33.

10. The method of claim 1, wherein the cultured dairy component includes nisin A and the *Lactococcus lactis* strain includes at least one gene from a nisin producing gene cluster and at least one gene from an exopolysaccharide producing gene cluster.

11. A method of producing a processed cheese haying natural antimicrobials, the method comprising:
   fermenting a 2 X to 5 X concentrated liquid dairy medium with a bacteria consisting essentially of lactic acid-producing *Lactococcus lactis* strain ATCC PTA-120552 to produce a cultured dairy component comprising nisin and exopolysaccharide under the same fermentation conditions;
   adding the cultured dairy component to a natural cheese or mixture of natural cheeses with one or more emulsifiers to produce a processed cheese having about 8 to about 25 percent protein and about 10 to about 20 percent fat;
   wherein the processed cheese includes an amount of nisin from the cultured dairy component effective to prevent toxin formation from *C. botulinum* determined by toxin bioassay with mice, in the processed cheese at the protein and the fat levels thereof for about 9 days at 86° F.; and wherein the processed cheese includes an amount of exopolysaccharide from the cultured dairy component effective to increase the melt of the processed cheese and increase the firmness of the processed cheese relative to a processed cheese without nisin and exopolysaccharide.

\* \* \* \* \*

UNITED STATES PATENT AND TRADEMARK OFFICE
CERTIFICATE OF CORRECTION

PATENT NO. : 10,375,972 B2  
APPLICATION NO. : 13/973660  
DATED : August 13, 2019  
INVENTOR(S) : Zuoxing Zheng Page 1 of 1

It is certified that error appears in the above-identified patent and that said Letters Patent is hereby corrected as shown below:

In the Claims

Column 58, Line 49, in Claim 11, delete "haying" and insert --having--.

Signed and Sealed this
Seventh Day of April, 2020

Andrei Iancu
*Director of the United States Patent and Trademark Office*